(12) United States Patent
Koyanagi et al.

(10) Patent No.: US 10,673,352 B2
(45) Date of Patent: Jun. 2, 2020

(54) POWER CONVERSION APPARATUS COMPRISING CELL BLOCKS EACH INCLUDING CASCADED CONVERTER CELLS AND A BYPASS CIRCUIT CONNECTED THERETO

(71) Applicant: MITSUBISHI ELECTRIC CORPORATION, Chiyoda-ku, Tokyo (JP)

(72) Inventors: Kimiyuki Koyanagi, Tokyo (JP); Ryosuke Uda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/074,113

(22) PCT Filed: Mar. 28, 2016

(86) PCT No.: PCT/JP2016/059921
§ 371 (c)(1),
(2) Date: Jul. 31, 2018

(87) PCT Pub. No.: WO2017/168518
PCT Pub. Date: Oct. 5, 2017

(65) Prior Publication Data
US 2019/0280614 A1    Sep. 12, 2019

(51) Int. Cl.
*H02M 7/483*    (2007.01)
*H02M 1/32*    (2007.01)
(Continued)

(52) U.S. Cl.
CPC ............ *H02M 7/483* (2013.01); *H02M 1/32* (2013.01); *H02M 7/48* (2013.01); *H02J 3/34* (2013.01);
(Continued)

(58) Field of Classification Search
CPC .... H02M 7/483; H02M 7/5387; H02M 7/217; H02M 7/219; H02M 7/484;
(Continued)

(56) References Cited

U.S. PATENT DOCUMENTS 5,065,304 A * 11/1991 Tamai ............... H02M 7/53875
363/95
6,242,895 B1 * 6/2001 Fujii ........................ G05F 1/70
323/207
(Continued)

FOREIGN PATENT DOCUMENTS

EP    2 369 725 A1    9/2011
EP    2549634 A1    1/2013
(Continued)

OTHER PUBLICATIONS

Extended European Search Report dated Mar. 21, 2019, issued by the European Patent Office in corresponding European Application No. 16896738.8. (8 pages).

(Continued)

*Primary Examiner* — Thienvu V Tran
*Assistant Examiner* — Nusrat Quddus
(74) *Attorney, Agent, or Firm* — Buchanan Ingersoll & Rooney PC

(57) ABSTRACT

A power conversion apparatus includes: a plurality of cell blocks connected in cascade; and a plurality of bypass circuits each electrically connected in parallel with a corresponding one of the plurality of cell blocks. Each cell block includes: a first connection node on a high-potential side and a second connection node on a low-potential side for connection to another cell block; and a plurality of cell converters connected in cascade between the first connection node and the second connection node, each of the cell converters including an energy storage device. When a DC (Continued)

fault current flows in the direction from the low-potential side to the high-potential side, the current path via the plurality of cell blocks is larger in impedance than the current path via the plurality of bypass circuits.

10 Claims, 17 Drawing Sheets

(51) Int. Cl.
*H02M 7/48* (2007.01)
*H02M 1/00* (2006.01)
*H02J 3/34* (2006.01)

(52) U.S. Cl.
CPC .............. *H02M 2001/0006* (2013.01); *H02M 2001/007* (2013.01); *H02M 2007/4835* (2013.01)

(58) Field of Classification Search
CPC ....... H02M 7/5383; H02M 2007/4834; H02M 2007/4835; H02M 2001/0003; H02M 1/32; H02M 1/00; H02M 3/087
See application file for complete search history.

(56) References Cited

U.S. PATENT DOCUMENTS

| | | | | |
|---|---|---|---|---|
| 9,252,681 | B2* | 2/2016 | Zhang | H02M 7/487 |
| 9,712,084 | B2* | 7/2017 | Kikuchi | H02M 7/483 |
| 2009/0244937 | A1* | 10/2009 | Liu | H02M 1/4216 |
| | | | | 363/46 |
| 2010/0066174 | A1 | 3/2010 | Dommaschk et al. | |
| 2010/0118578 | A1* | 5/2010 | Dommaschk | H02M 7/483 |
| | | | | 363/127 |
| 2011/0235221 | A1 | 9/2011 | Vögeli | |
| 2011/0280049 | A1* | 11/2011 | Mori | H02M 1/4216 |
| | | | | 363/25 |
| 2012/0195084 | A1* | 8/2012 | Norrga | H02M 7/483 |
| | | | | 363/127 |
| 2013/0155732 | A1* | 6/2013 | Wagoner | H02J 3/01 |
| | | | | 363/40 |
| 2013/0308235 | A1* | 11/2013 | Davies | H02H 7/1257 |
| | | | | 361/62 |
| 2015/0062991 | A1* | 3/2015 | Zhang | H02M 7/487 |
| | | | | 363/131 |
| 2015/0236603 | A1* | 8/2015 | Jimichi | H02M 5/293 |
| | | | | 363/37 |
| 2015/0349520 | A1* | 12/2015 | Davidson | H02M 7/483 |
| | | | | 361/57 |
| 2015/0357905 | A1* | 12/2015 | Nami | H02M 1/32 |
| | | | | 363/53 |
| 2015/0357931 | A1* | 12/2015 | Oates | H02M 7/493 |
| | | | | 363/89 |
| 2016/0013716 | A1* | 1/2016 | Hur | H02M 1/32 |
| | | | | 363/50 |
| 2016/0036314 | A1* | 2/2016 | Koyanagi | H02M 1/32 |
| | | | | 363/65 |
| 2016/0094117 | A1* | 3/2016 | Hu | H02M 1/32 |
| | | | | 363/51 |
| 2016/0329831 | A1* | 11/2016 | Mukunoki | H02M 7/483 |
| 2016/0336874 | A1* | 11/2016 | Kikuchi | H02M 7/483 |
| 2017/0047860 | A1* | 2/2017 | Fujii | H02M 7/483 |
| 2017/0054294 | A1* | 2/2017 | Lyu | H02J 3/01 |
| 2017/0163170 | A1* | 6/2017 | Tahata | H02J 5/00 |
| 2017/0163171 | A1* | 6/2017 | Park | H02M 7/537 |
| 2017/0170658 | A1* | 6/2017 | Tengner | H02J 3/1857 |
| 2017/0214334 | A1* | 7/2017 | Mukunoki | H02M 1/12 |
| 2017/0288569 | A1* | 10/2017 | Uda | H02M 1/32 |
| 2017/0310237 | A1* | 10/2017 | Uda | H02M 7/12 |
| 2018/0026519 | A1* | 1/2018 | Tengner | H02J 3/32 |
| | | | | 320/137 |
| 2018/0069488 | A1* | 3/2018 | Mukunoki | H02M 7/48 |
| 2018/0109200 | A1* | 4/2018 | Kuroda | H02M 7/12 |
| 2018/0159422 | A1* | 6/2018 | Kikuchi | H02M 7/12 |
| 2019/0068076 | A1* | 2/2019 | Uda | H02M 1/00 |

FOREIGN PATENT DOCUMENTS

| | | | |
|---|---|---|---|
| JP | 2010512135 A | 4/2010 | |
| JP | 5378274 B2 | 12/2013 | |
| WO | 2008/067786 A1 | 6/2008 | |
| WO | WO-2011042050 A1 * | 4/2011 | ............ H02M 7/483 |
| WO | 2014148100 A1 | 9/2014 | |
| WO | 2015/121983 A1 | 8/2015 | |

OTHER PUBLICATIONS

International Search Report (PCT/ISA/210) dated Jun. 7, 2016, by the Japanese Patent Office as the International Searching Authority for International Application No. PCT/JP2016/059921.

Written Opinion (PCT/ISA/237) dated Jun. 7, 2016, by the Japanese Patent Office as the International Searching Authority for International Application No. PCT/JP2016/059921.

European Office Action dated Jan. 7, 2020, issued by the European Patent Office in corresponding European Patent Application No. 16 896 738.8-1201, 4 pages.

* cited by examiner

POWER CONVERSION APPARATUS COMPRISING CELL BLOCKS EACH INCLUDING CASCADED CONVERTER CELLS AND A BYPASS CIRCUIT CONNECTED THERETO

TECHNICAL FIELD

The present disclosure relates to a power conversion apparatus for performing power conversion between AC and DC that is suitably used for, for example, a modular multilevel converter.

BACKGROUND ART

A modular multilevel converter (MMC) comprises a plurality of cell converters (chopper circuits) connected in cascade. Each cell converter includes a capacitor and switching elements for controlling the voltage between output terminals to be a zero voltage or a capacitor voltage (see, for example, Japanese Patent No. 5378274: PTD 1).

The MMC, which has a plurality of cell converters connected in cascade, can output a voltage that is greater than or equal to the withstand voltage of the switching elements constituting each cell converter. Therefore, the MMC is expected to be applied to a high-voltage direct current (HVDC) system and a static synchronous compensator (STATCOM).

PTD 2 (WO 2014/148100) discloses a means for protecting cell converters from a DC short-circuit circulating current if a DC short-circuit accident occurs due to a lightning strike onto a DC overhead transmission line in an HVDC system.

Specifically, each cell converter includes: a main circuit constituted of switching elements and a DC capacitor; an external terminal for connection to another cell converter in cascade; and freewheel diodes each connected in antiparallel with a corresponding one of the switching elements. A cell block is formed for each of a plurality of cell converters. A bypass circuit is connected to two external connection terminals of each cell block. If a DC short-circuit accident occurs, the bypass circuit passes a DC short-circuit circulating current, instead of the freewheel diodes in each cell block. Each of the bypass circuits that has an enough current capacity relative to the DC short-circuit circulating current would be able to protect each cell block from the DC short-circuit circulating current.

CITATION LIST

Patent Document

PTD 1: Japanese Patent No. 5378274
PTD 2: WO 2014/148100

SUMMARY OF INVENTION

Technical Problem

In the case of the configuration of PTD 2, a current flows through both the freewheel diodes in the cell blocks and the bypass circuit at the time of occurrence of a DC short-circuit accident. In order to prevent breakage of the freewheel diodes due to a DC short-circuit current, limitation should be imposed on a current that flows through the freewheel diodes. PTD 2, however, does not describe taking measures against it. Accordingly, if a DC short-circuit circulating current greater than or equal to an allowable current flows through the freewheel diodes in the cell blocks, the freewheel diodes will break. This will make it impossible for the system to continue its operation.

The present disclosure has been made in order to solve the above-described problem in one aspect. An object of the present disclosure is to provide a power conversion apparatus capable of reliably protecting the freewheel diodes in each cell block at the occurrence of a DC short-circuit accident. Problems and novel features of the present disclosure in other aspects will be apparent from the description of this specification below and the accompanying drawings.

Solution to Problem

The present disclosure is directed to a power conversion apparatus including: a plurality of cell blocks connected in cascade; and a plurality of bypass circuits each electrically connected in parallel with a corresponding one of the plurality of cell blocks. Each of the cell blocks includes: a first connection node on a high-potential side and a second connection node on a low-potential side for connection to another cell block; and a plurality of cell converters connected in cascade between the first connection node and the second connection node, each of the plurality of cell converters including an energy storage device. When a DC fault current flows in the direction from the low-potential side to the high-potential side, the current path via the plurality of cell blocks is larger in impedance than the current path via the plurality of bypass circuits.

Advantageous Effects of Invention

According to the present disclosure, the current path via the plurality of cell blocks is larger in impedance than the current path via the plurality of bypass circuits. Therefore, the freewheel diodes in each cell block can reliably be protected at the occurrence of a DC short-circuit accident.

DESCRIPTION OF EMBODIMENTS

Each embodiment is described in detail hereinafter with reference to the drawings. Identical or corresponding components are identically denoted and the description of such components will not be repeated.

First Embodiment

[General Configuration of Power Conversion Apparatus]

Figure 1:
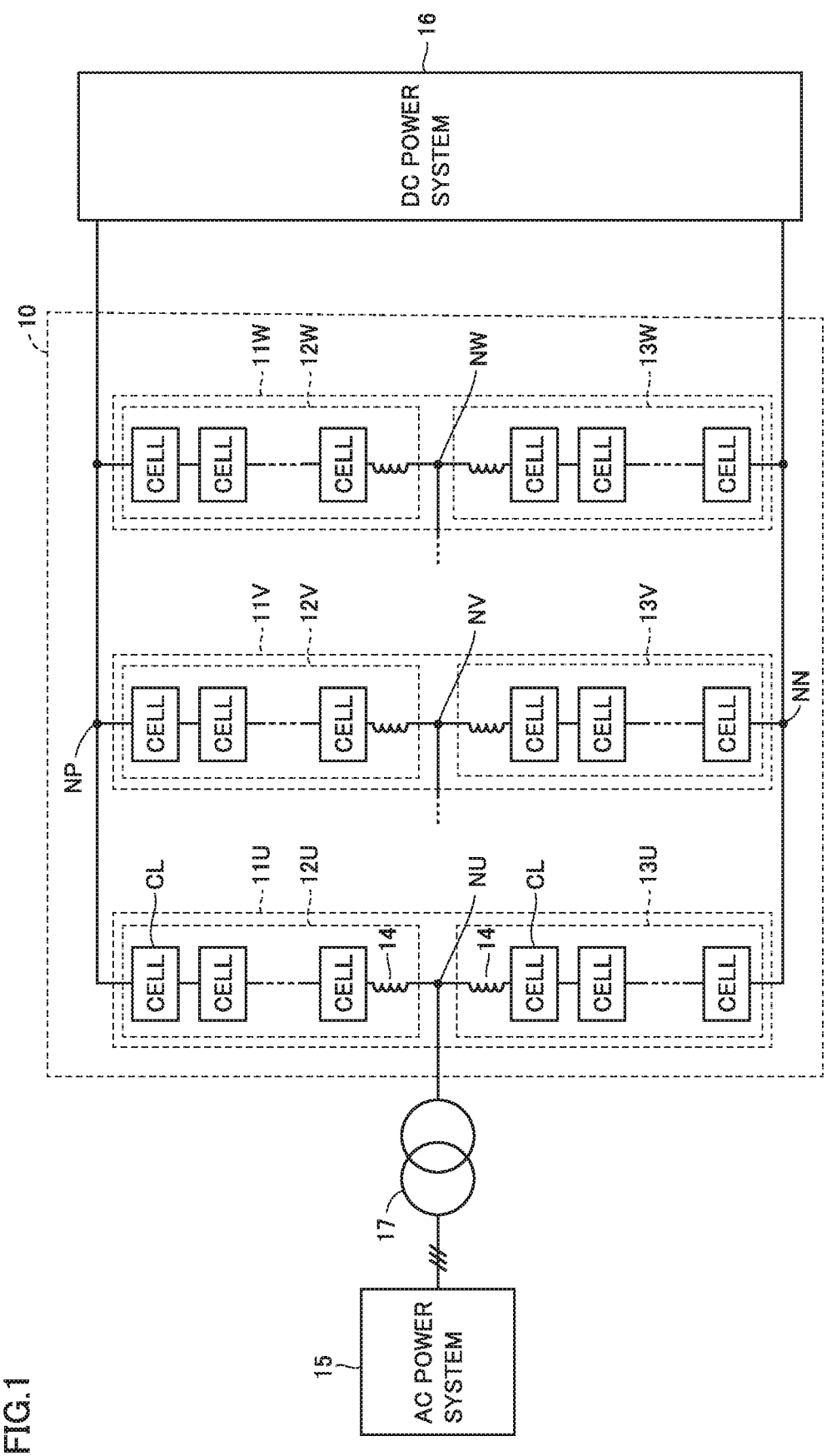
FIG. 1 is a circuit diagram showing a general configuration of a power conversion apparatus.

FIG. 1 is a circuit diagram showing a general configuration of a power conversion apparatus. With reference to FIG. 1, a power conversion apparatus 10 includes leg circuits 11U, 11V, 11W (which will be referred to as leg circuit(s) 11 when reference is made to them collectively or to an unspecified one of them), and a control device (not shown) for controlling these leg circuits 11.

Leg circuit 11 is provided for each of a plurality of phases constituting AC and is connected between and an AC circuit 15 and a DC circuit 16 for power conversion between these circuits. FIG. 1 shows a case of AC circuit 15 having three-phase AC, in which case three leg circuits 11U, 11V, 11W are provided for U-phase, V-phase, and W-phase, respectively.

AC terminals NU, NV, NW provided for leg circuits 11U, 11V, 11W, respectively, are connected to AC circuit 15 via an interconnected transformer 17. AC circuit 15 is an AC power system including, for example, an AC power supply. For ease of illustration, FIG. 1 does not show the connection between AC terminals NV, NW and interconnected transformer 17. DC terminals NP, NN (a positive-side DC terminal NP and a negative-side DC terminal NN) provided to be shared by leg circuits 11 are connected to DC circuit 16. DC circuit 16 is a DC power system including, for example, a DC transmission network and another power conversion apparatus for outputting DC.

Instead of using interconnected transformer 17 of FIG. 1, an interconnected reactor may be used to connect each leg circuit 11 to AC circuit 15. Further, in place of AC terminals NU, NV, NW, leg circuits 11U, 11V, 11W may include their respective primary windings, and leg circuits 11U, 11V, 11W may be connected to interconnected transformer 17 or the interconnected reactor with respect to AC, with secondary windings magnetically coupled with these primary windings. In such a case, each of the primary windings may be a reactor 14 described later. In other words, leg circuits 11 are electrically connected to AC circuit 15 (with respect to DC or AC) through the connection portions provided for leg circuits 11U, 11V, 11W, such as AC terminals NU, NV, NW or the above-described primary windings.

Leg circuit 11U can be divided into a positive-side arm (which is also referred to as an upper arm or a primary arm) 12U from positive-side DC terminal NP to AC input terminal NU, and a negative-side arm (which is also referred to as a lower arm or a secondary arm) 13U from negative-side DC terminal NN to AC input terminal NU. Connection point NU between positive-side arm 12U and negative-side arm 13U is connected to interconnected transformer 17. Positive-side DC terminal NP and negative-side DC terminal NN are connected to DC circuit 16. Leg circuit 11U is described as a representative hereinafter since leg circuits 11V, 11W also have the same configuration.

Positive-side arm 12U includes a plurality of cell converters (chopper cells) CL connected in cascade and reactor 14. The detailed configuration of positive-side arm 12U is described with reference to FIG. 2. Similarly, negative-side arm 13U includes a plurality of cell converters CL connected in cascade and reactor 14. The detailed configuration of negative-side arm 13U is described with reference to FIG. 2. Reactor 14 connected in series with the cell converter group may be provided in only one of positive-side arm 12U and negative-side arm 13U, or may be provided in both of positive-side arm 12U and negative-side arm 13U. In the following description, positive-side arm 12U and negative-side arm 13U are collectively referred to as an arm circuit.

[Configuration of Arm Circuit]

Figure 2:
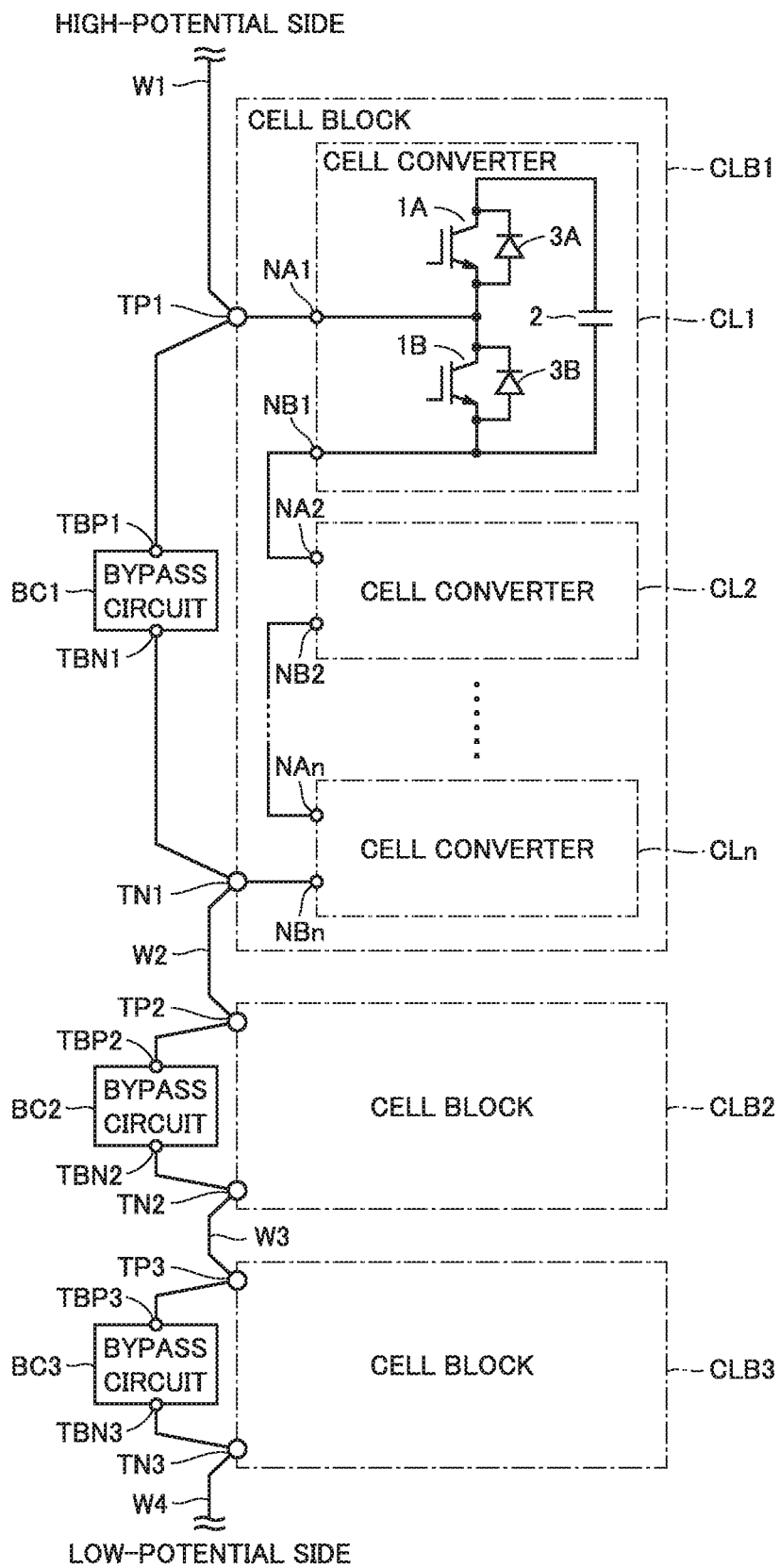
FIG. 2 is a circuit diagram showing a configuration of each arm circuit of FIG. 1 in a first embodiment.

FIG. 2 is a circuit diagram showing a configuration of each arm circuit of FIG. 1 in the first embodiment. With reference to FIG. 2, each arm circuit includes m cell blocks CLB (m is an integer of 2 or more) connected in cascade, from first cell block CLB1 at a high-potential end to mth cell block CLBm at a low-potential end. In the case of FIG. 2, cell block CLB1 to cell block CLB3 are representatively shown. Each arm circuit further includes m bypass circuits BC corresponding to m cell blocks CLB, respectively. The m bypass circuits BC include first bypass circuit BC1 at a high-potential end to mth bypass circuit BCm at a low-potential end. Each bypass circuit BC is electrically connected in parallel with a corresponding cell block CLB.

An ith cell block CLBi (i is any integer satisfying $1 \leq i \leq m$) includes a first external connection terminal Tpi on a high-potential side and a second external connection terminal TNi on a low-potential side for connection to another cell block CLB, and a plurality of (n) cell converters CL1 to CLn connected in cascade between external connection terminals TPi and TNi. In the case of the first embodiment, n is an integer of 3 or more. The number of cell converters CL included in each cell block CLB may vary from one cell block CLB to another.

In the case of FIG. 2, each cell converter CL has a half-bridge configuration. Note that, although FIG. 2 representatively shows an internal circuit of first cell converter CL1, the other cell converters have the same circuit configuration. Specifically, qth cell converter CLq (q is any integer satisfying $1 \leq q \leq n$) includes: a high-potential-side output node NAq and a low-potential-side output node NBq for connection to another cell converter CL; switching elements 1A, 1B connected in series; a capacitor 2 as an energy storage device; and freewheel diodes 3A, 3B.

Capacitor 2 is connected in parallel with switching elements 1A, 1B. Freewheel diodes 3A, 3B respectively correspond to switching elements 1A, 1B, and each freewheel diode is connected to a corresponding one of the switching elements in anti-parallel (i.e., in parallel and in the reversely-biased direction). The connection point between switching elements 1A and 1B is connected to high-potential-side output node NAq. The connection point between switching element 1B and capacitor 2 is connected to low-potential-side output node NBq. Although an insulated gate bipolar transistor (IGBT) is used as each switching element in FIG. 2, another type of semiconductor switching element may be used.

As shown in FIG. 2, in cell block CLB1 (ditto for the other cell blocks), output node NA1 of cell converter CL1 at a highest-potential end is connected to first external connection terminal TP1 of cell block CLB1, and output node NBn of cell converter CLn at a lowest-potential end is connected to second external connection terminal TN1 of cell block CLB1. Low-potential-side output node NBq of qth cell converter CLq (q is any integer satisfying 1≤q≤n−1) is connected to high-potential-side output node NA(q+1) of (q+1)th cell converter CL(q+1). High-potential-side output node NAq of qth cell converter CLq (q is any integer satisfying 2≤q≤n) is connected to low-potential-side output node NB(q−1) of (q−1)th cell converter CL(q−1).

Although not shown, a gate driving device is connected to a gate terminal of first switching element 1A and a gate terminal of second switching element 1B so as to output a gate driving signal to turn switching elements 1A, 1B on and off. As described with reference to FIG. 4, FIG. 5, and FIG. 8, each cell converter CL is fixed onto a substrate and is fitted on a structure.

Bypass circuit BCi (i is any integer satisfying 1≤i≤m) is connected directly (i.e., without another external connection terminal lying therebetween) to first and second external connection terminals TPi and TNi of a corresponding cell block CLBi. That is, a high-potential-side external connection terminal TBPi of bypass circuit BCi is connected to external connection terminal Tpi of cell block CLBi via an interconnect, and a low-potential-side external connection terminal TBNi of bypass circuit BCi is connected to low-potential-side external connection terminal TNi of cell block CLBi via an interconnect. Bypass circuit BC is provided to protect freewheel diode 3B in cell block CLB from a circulating current (DC short-circuit current) flowing between the power converter and the DC circuit if a DC short-circuit accident occurs in the HVDC system.

[Path of Circulating Current at the Time of DC Short Circuit]

Figure 3:
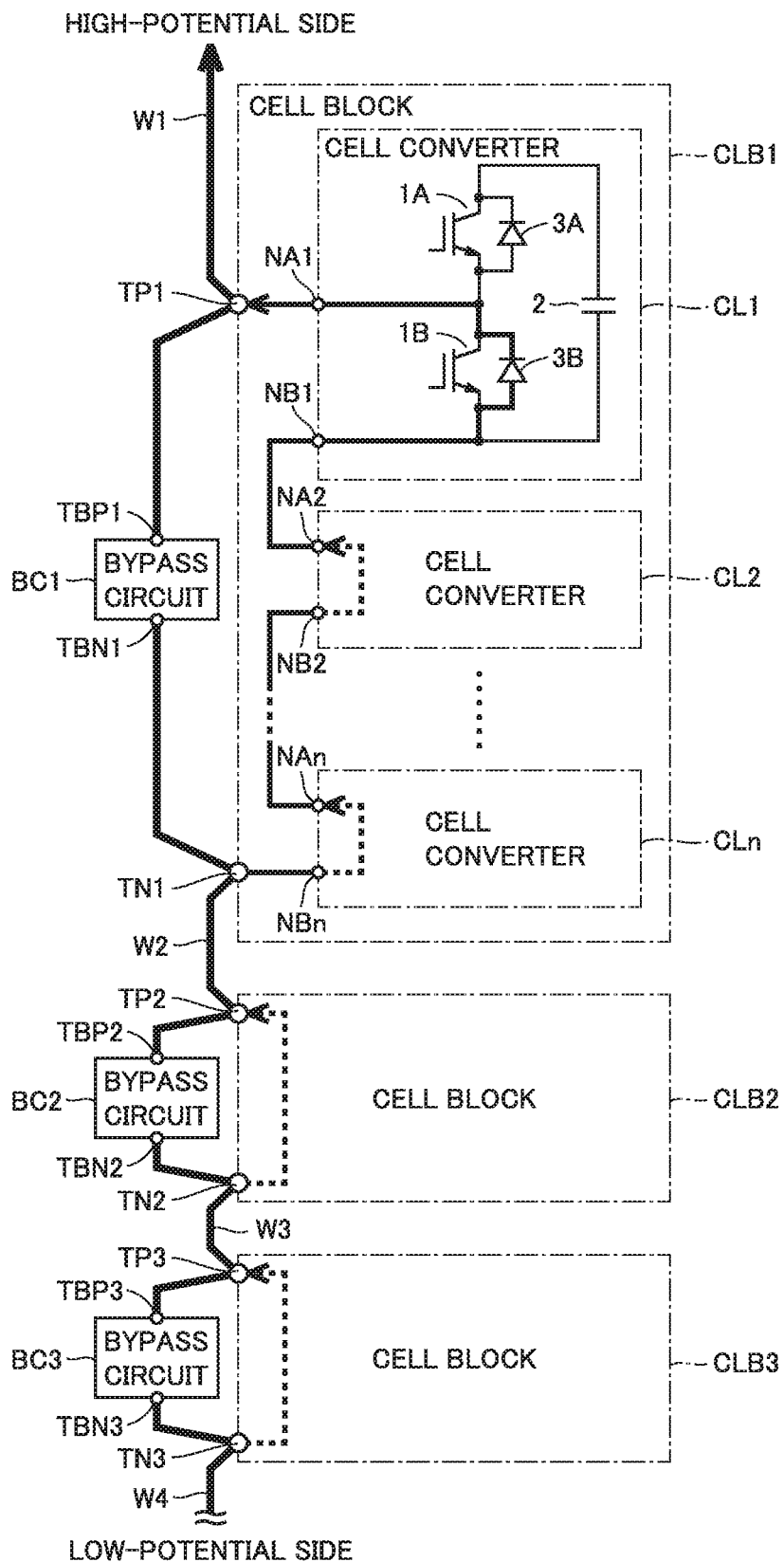
FIG. 3 shows a path of circulating current flowing at the time of a short-circuit accident at the DC circuit, in the arm circuit of FIG. 2.

FIG. 3 shows a path of circulating current flowing at the time of a short-circuit accident at the DC circuit, in the arm circuit of FIG. 2. Occurrence of a short-circuit accident at the DC circuit can be detected by, for example, the sum of arm currents of the phases exceeding a threshold value, or by the absolute value of any of the arm currents exceeding a threshold value. If occurrence of a short-circuit accident at the DC circuit is detected, all the semiconductor switching elements of the cell converters constituting each cell block CLB are controlled to be OFF (open state).

As shown in FIG. 3, a path of circulating current includes a path of current flowing through each bypass circuit BC indicated by a thick line in FIG. 3, and a path of current flowing through freewheel diode 3B of each cell block CLB indicted by a moderate-thickness line in FIG. 3. In the case of the first embodiment, the interconnects (interconnects W1, W2, W3, W4 in FIG. 3) between adjacent cell blocks CLB are shared by both of the paths of current.

In order to protect freewheel diode 3B of each cell converter CL, the amount of current in the former current path via bypass circuits BC should be larger than the amount of current in the latter current path via cell blocks CLB. For this purpose, in each cell block CLBi (i is any integer satisfying 1≤i≤m), the distance between first and second external connection terminals TPi and TNi should be as short as possible, and the connection lines between these external connection terminals TPi, TNi and corresponding bypass circuit BCi should be as short as possible. By doing so, if a DC short-circuit accident occurs in the HVDC system, the circulating-current path via each bypass circuit BC can be smaller in impedance than the circulating-current path via cell converters CL1 to CLn in each cell block CLB. This allows more DC short-circuit circulating current to flow in bypass circuits BC than in cell blocks CLB.

In order to achieve the above described arrangement, it is preferred that, in cell block CLBi, cell converter CL1 at the highest potential end connected to first external connection terminal Tpi and cell converter CLn at the lowest potential end connected to second external connection terminal TNi be provided closer to a corresponding bypass circuit BCi than other cell converters CL are. In other words, it is preferred that cell converter CL1 and cell converter CLn be arranged so to be adjacent to each other in cell block CLBi.

[Example of Specific Structure of Arm Circuit]

Figure 4:
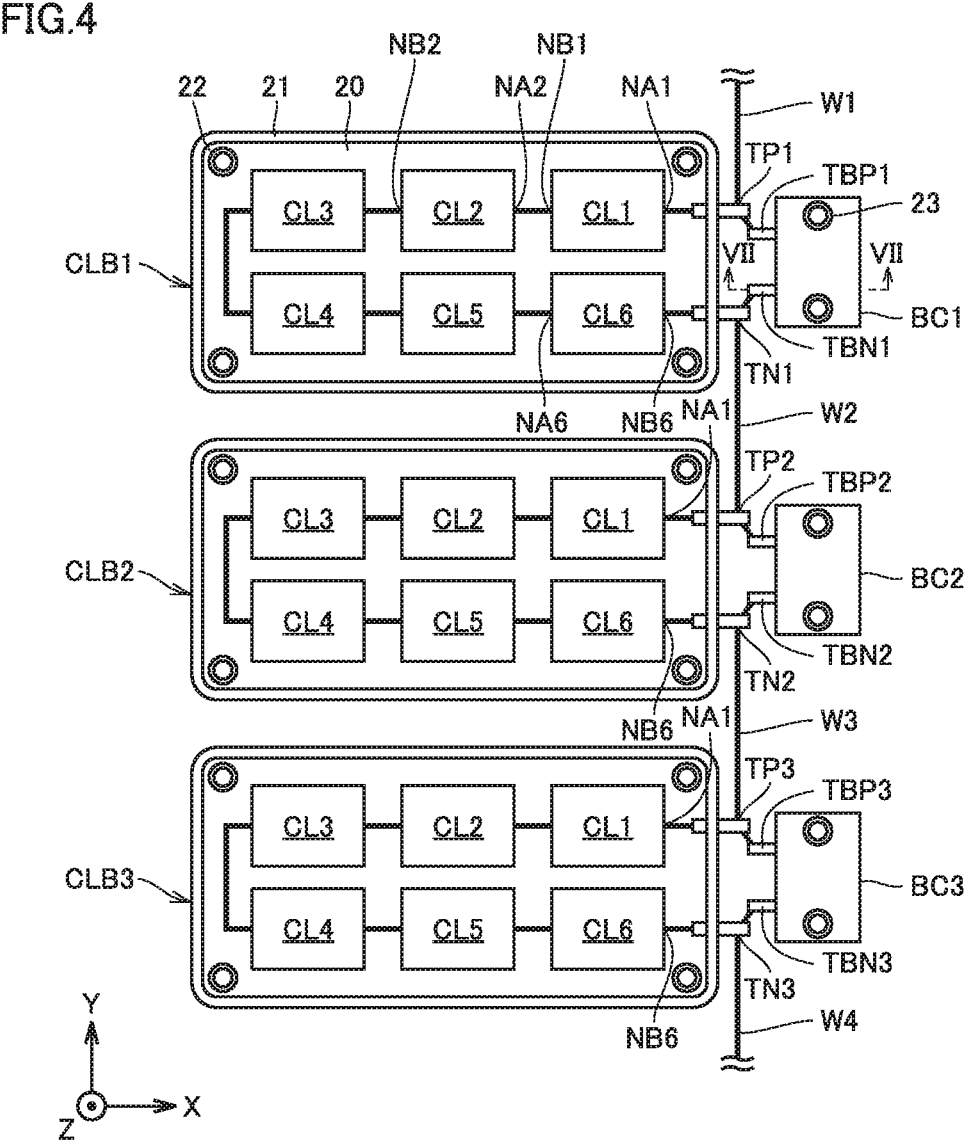
FIG. 4 is a plan view showing an example of a specific structure of the arm circuit of FIG. 2.
Figure 5:
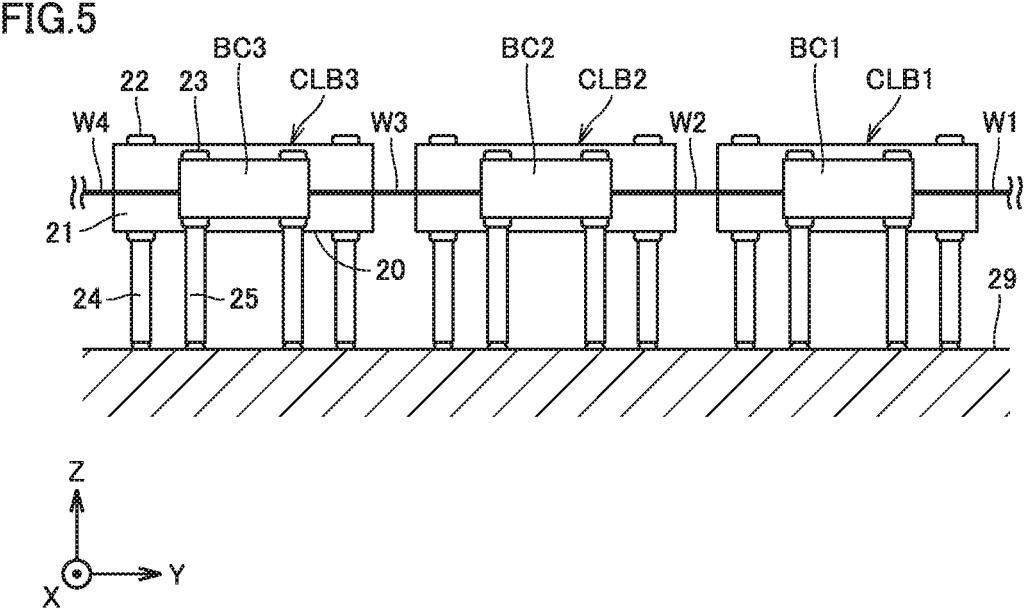
FIG. 5 is a side view of the arm circuit of FIG. 4.

FIG. 4 is a plan view showing an example of a specific structure of the arm circuit of FIG. 2. FIG. 5 is a side view of the arm circuit of FIG. 4. The plan view of FIG. 4 and the side view of FIG. 5 show an example of a specific structure of an arm circuit that satisfies the above-described arrangement conditions.

With reference to FIG. 4 and FIG. 5, each cell block CLB includes a rectangular insulating substrate 20 for fixing cell converters CL, an insulating shield 21 provided at the periphery of insulating substrate 20 so as to surround insulating substrate 20, and four insulators 22 attached to the four corners of insulating substrate 20. Insulators 22 have their respective through-holes passing through the substrate in the vertical direction. Each cell block CLB is supported on a mounting surface 29 by insulating poles 24 passing through these through-holes. In the example of FIG. 5, substrates 20 of cell blocks CLB1 to CLB3 are arranged in the horizontal direction along mounting surface 29, which is a shared reference surface.

Similarly, each bypass circuit BC has insulators 23 attached thereto, and is supported on mounting surface 29 by insulating poles 25 passing through insulators 23. Bypass circuits BC1 to BC3 are arranged substantially at the same height as cell blocks CLB1 to CLB3 and in the horizontal direction along mounting surface 29. The arrangement of cell blocks CLB and bypass circuits BC in a planar manner in the horizontal direction as described above makes it possible to extend the overall system in the horizontal direction in accordance with the number of cell blocks CLB and bypass circuits BC.

The arrangement of cell converters CL in each cell block CLB will now be described. FIG. 4 shows an example in which six cell converters CL1 to CL6 are provided for each cell block CLB (a case of n=6). First cell block CLB1 is described as a representative hereinafter, and ditto for the other cell blocks CLB.

As shown in FIG. 4, first and second external connection terminals TP1, TN1 are provided near the same short side of rectangular substrate 20. Cell converters CL1, CL6 are provided close to external connection terminals TP1, TN1. Thus, cell converters CL1, CL6 are fixed so as to be adjacent to each other on the substrate.

Cell converter CL2 is arranged remoter from external connection terminal TP1 than cell converter CL1 is, and cell converter CL3 is arranged remoter from external connection terminal TP1 than cell converter CL2 is. Similarly, cell converter CL5 is arranged remoter from external connection terminal TN1 than cell converter CL6 is, and cell converter CL4 is arranged remoter from external connection terminal TN1 than cell converter CL5 is. In other words, external connection terminal TP1 and cell converters CL1, CL2, CL3 are linearly arranged in this order in the X-axis direction; and external connection terminal TN1 and cell converter CL6, CL5, CL4 are arranged in this order substantially in parallel with the arrangement of external connection terminal TP1 and cell converters CL1, CL2, CL3.

Bypass circuit BC1 is arranged at a position facing external connection terminals TP1, TN1 of a corresponding cell block CLB1. This allows connection between external connection terminal TP1 of cell block CLB1 and external connection terminal TBP1 of bypass circuit BC1 with a shortest possible interconnect, and allows connection between external connection terminal TN1 of cell block CLB1 and external connection terminal TBN1 of bypass circuit BC1 with a shortest possible interconnect.

[Example Configuration of Bypass Circuit]

FIGS. 6A-6D are circuit diagrams each showing examples of the configuration of bypass circuit.

Figure 6A:
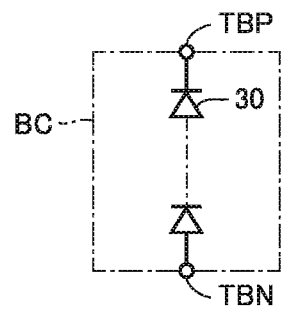
FIGS. 6A-6D are circuit diagrams each showing examples of the configuration of bypass circuit.

In the example of FIG. 6A, bypass circuits BC each include a plurality of diode elements 30 connected in series. The cathode of each diode element 30 is provided closer to high-potential-side external connection terminal TBP, and the anode of each diode element 30 is provided closer to low-potential-side external connection terminal TBN. Since diodes allow a flow of forward current from the anode side to the cathode side, the direction from low-potential-side external connection terminal TBN to high-potential-side external connection terminal TBP is the flowing direction. This flowing direction is the same as the flowing direction of DC short-circuit circulating current in cell blocks at occurrence of a DC short-circuit accident, and thus the DC short-circuit current can escape to diode elements 30 of bypass circuits BC.

Figure 6B:
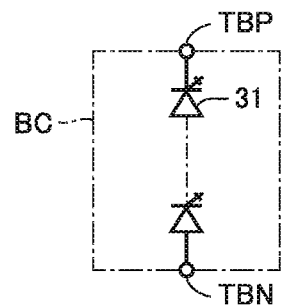

In the example of FIG. 6B, bypass circuits BC each include a plurality of thyristor elements 31 connected in series. The cathode of each thyristor element 31 is provided closer to high-potential-side external connection terminal TBP, and the anode of each thyristor element 31 is provided closer to low-potential-side external connection terminal TBN. Since diodes allow a flow of forward current from the anode side to the cathode side, the direction from low-potential-side external connection terminal TBN to high-potential-side external connection terminal TBP is the flowing direction. This flowing direction is the same as the flowing direction of DC short-circuit circulating current in cell blocks at occurrence of a DC short-circuit accident, and thus the DC short-circuit current can escape to thyristor elements 31 of bypass circuits BC.

Figure 6C:
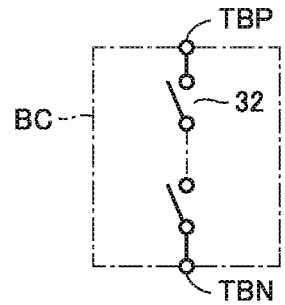

In the example of FIG. 6C, bypass circuits BC each include a plurality of mechanical switch elements 32 connected in series. Since mechanical switch elements 32 allow a current to flow in two directions, a DC short-circuit circulating current in cell blocks can escape to mechanical switch elements 32 at occurrence of a DC short-circuit accident.

Figure 6D:
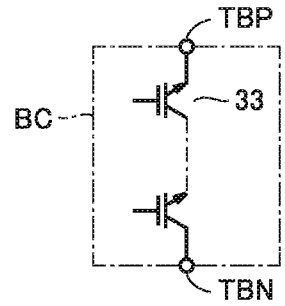

In the example of FIG. 6D, bypass circuits BC each include a plurality of IGBT elements 33 connected in series. The emitter of each IGBT element 33 is provided closer to high-potential-side external connection terminal TBP, and the collector of each IGBT element 33 is provided closer to low-potential-side external connection terminal TBN. Since IGBTs allow a flow of forward current from the collector side to the emitter side, the direction from low-potential-side external connection terminal TBN to high-potential-side external connection terminal TBP is the flowing direction. This flowing direction is the same as the flowing direction of DC short-circuit circulating current in cell blocks at occurrence of a DC short-circuit accident, and thus the DC short-circuit current can escape to IGBT elements 33 of bypass circuits BC.

Figure 7:
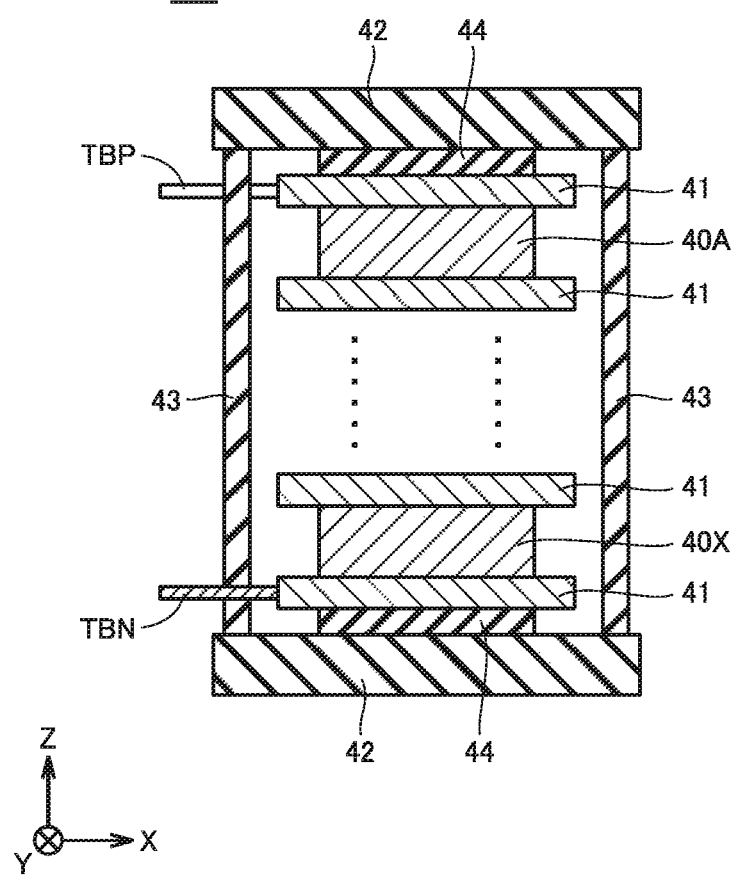
FIG. 7 is a cross-sectional side view showing an example of a specific structure of the bypass circuit.

FIG. 7 is a cross-sectional side view showing an example of a specific structure of the bypass circuit. The cross-sectional view of FIG. 7 shows a section taken along the line VII-VII of FIG. 4. As shown in FIG. 7, bypass circuits BC each have a stack structure where a plurality of elements shown in any one of FIGS. 6A to 6D are stacked in series. In the case of FIG. 6A, FIG. 6B, and FIG. 6D, the semiconductor elements are preferably configured as a vertical structure.

Specifically, with reference to FIG. 7, bypass circuits BC each include a plurality of elements 40A to 40X stacked with conductive plates 41 being disposed between the elements. Elements 40A to 40X and conductive plates 41 are integrated together to form a stack structure. The stack structure is fixed by supporting members 44 in a housing made up of insulating members 42, 43. External connection terminals TBP and TBN are connected to respective conductive plates 41 at both ends of the stack structure.

According to the above-described configuration, a plurality of elements tightly stacked together allows a small interconnect impedance of each bypass circuit BC. Bypass circuits BC can be placed independently of cell converters CL, providing a higher degree of flexibility in placement. Further, the number of elements to be stacked can be changed in accordance with a change in the number of cell converters CL.

[Variation of Specific Structure of Arm Circuit]

Figure 8:
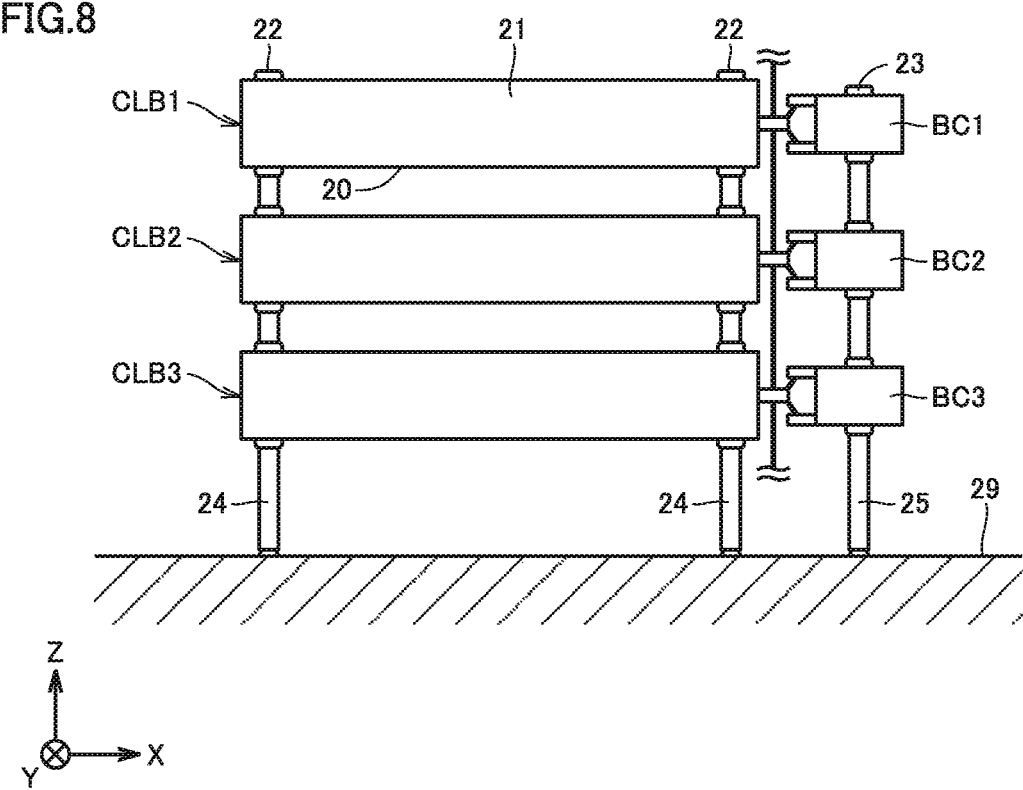
FIG. 8 is a side view showing another example of a specific structure of the arm circuit.

FIG. 8 is a side view showing another example of a specific structure of the arm circuit. In FIG. 8, cell blocks CLB1 to CLB3 and bypass circuits BC are arranged so as to be stacked in the vertical direction from mounting surface 29 of the power conversion apparatus.

Specifically, as shown in FIG. 8, cell blocks CLB1 to CLB3 are supported on mounting surface 29 with shared poles 24 passing through insulators 22 attached to the four corners of each insulating substrate 20. Similarly to the case of FIG. 4 and FIG. 5, each cell block CLB has insulating shield 21 provided at the periphery of insulating substrate 20 so as to surround insulating substrate 20. Bypass circuits BC1 to BC3 are supported on mounting surface 29 with shared poles 25 passing through insulators 23 attached to each of bypass circuits BC1 to BC3. Therefore, as seen from the direction perpendicular to mounting surface 29, substrates 20 of cell blocks CLB1 to CLB3 coincide in position.

Cell block CLB and bypass circuit BC corresponding to each other are provided substantially at the same height from mounting surface 29. Each bypass circuit BC is provided at a position facing external connection terminals TP, TN of a corresponding cell block CLB. This allows connection between external connection terminals TP, TN of each cell block CLB and external connection terminals TBP, TBN of a corresponding bypass circuit BC with a shortest possible interconnect.

The arrangement of cell blocks CLB and bypass circuits BC in the vertical direction as described above makes it possible to extend the overall system in the vertical direction in accordance with the number of cell blocks CLB and bypass circuits BC. Note that, the arrangement of FIG. 8 may be combined with the arrangement of FIGS. 4 and 5, so that cell blocks CLB and bypass circuits BC can be extended in both the horizontal and vertical directions.

[Advantageous Effects]

As described above, according to the power conversion apparatus in the first embodiment, in the configuration where cell blocks CLB each including a plurality of cell converters CL are connected in parallel with bypass circuits BC, each bypass circuit BC is connected between first and second external connection terminals TP and TN of a corresponding cell block CLB. In this case, in each cell block CLB, cell converter CL at a highest-potential end connected to first external connection terminal TP and cell converter CL at a lowest-potential end connected to second external connection terminal TN are arranged closer to a corresponding bypass circuit BC than the remaining cell converters CL are. Accordingly, at the time of a short-circuit accident at the DC circuit, the circulating-current path via bypass circuits BC can be smaller in impedance than the circulating-current path via cell blocks CLB. Also, a plurality of cell converters CL can be arranged to be compact in size.

Second Embodiment

[Configuration of Arm Circuit]

Figure 9:
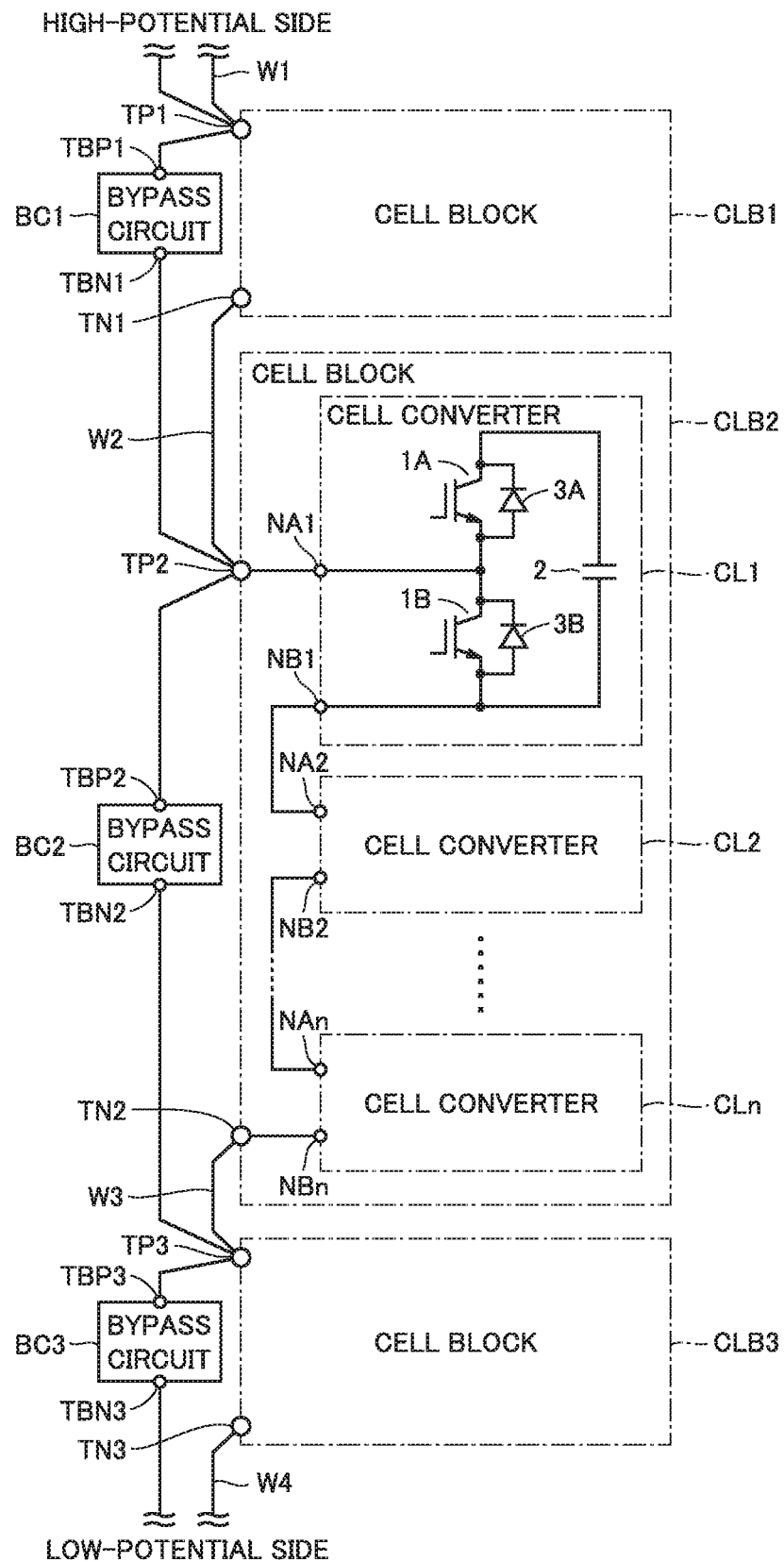
FIG. 9 is a circuit diagram showing a configuration of each arm circuit of FIG. 1 in a second embodiment.

FIG. 9 is a circuit diagram showing a configuration of each arm circuit of FIG. 1 in a second embodiment. The configuration of the arm circuit in FIG. 9 is different from that of the first embodiment in FIG. 2 in the connection of each bypass circuit BC.

Specifically, in the case of FIG. 9, bypass circuit BCj (j is any integer satisfying 1≤j≤m−1) is connected directly (i.e., without another external connection terminal lying therebetween) to first external connection terminal TPj of a corresponding cell block CLBj and to first external connection terminal TP(j+1) of cell block CLB(j+1). That is, high-potential-side external connection terminal TBPj of bypass circuit BCj is connected to high-potential-side external connection terminal TPj of cell block CLBj via an interconnect, and low-potential-side external connection terminal TBNj of bypass circuit BCj is connected to high-potential-side external connection terminal TP(j+1) of cell block CLB(j+1) via an interconnect.

Note that low-potential-side external connection terminal TBNm of bypass circuit BCm at a lowest-potential end and low-potential-side external connection terminal TNm of cell block CLBm at a lowest-potential end are connected to each other (or connected to the same node). FIG. 9 is the same as FIG. 2 in the other respects, and thus identical or corresponding components are identically denoted and the description of such components will not be repeated.

[Path of Circulating Current at the Time of DC Short Circuit]

Figure 10:
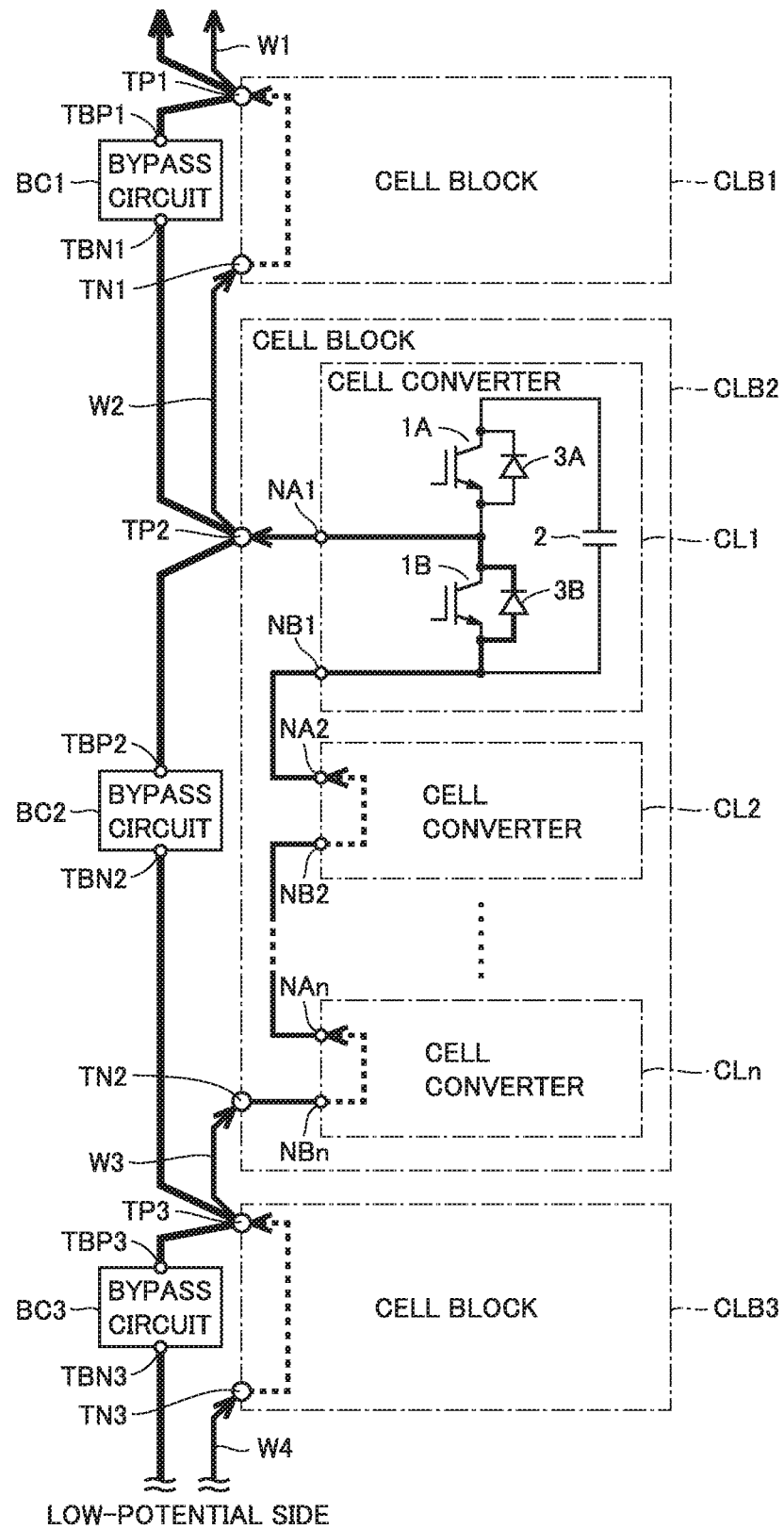
FIG. 10 shows a path of circulating current at the time of a short-circuit accident at the DC circuit, in the arm circuit of FIG. 9.

FIG. 10 shows a path of circulating current at the time of a short-circuit accident at the DC circuit, in the arm circuit of FIG. 9.

As shown in FIG. 10, a path of circulating current includes a path of current flowing through each bypass circuit BC indicated by a thick line in FIG. 10, and a path of current flowing through freewheel diode 3B of each cell block CLB indicated by a moderate-thickness line in FIG. 10. In the case of the second embodiment, the former short-circuit current via bypass circuits BC does not flow through the interconnects (interconnects W1, W2, W3, W4 in FIG. 10) between adjacent cell blocks CLB.

In order to protect freewheel diode 3B of each cell converter CL, the amount of current in the former current path via bypass circuits BC should be larger than the amount of current in the latter current path via cell blocks CLB. For this purpose, the distance between first external connection terminal TPj of cell block CLBj (j is any integer satisfying 1≤j≤m−1) and first external connection terminal TP(j+1) of cell block CLB(j+1) should be as short as possible, and the connection lines between these first external connection terminals TPj, TP(j+1) and bypass circuit BCj should be as short as possible. By doing so, if a DC short-circuit accident occurs in the HVDC system, the circulating-current path via each bypass circuit BC can be smaller in impedance than the circulating-current path via cell converters CL1 to CLn in each cell block CLB. This allows more DC short-circuit circulating current to flow in bypass circuits BC than in cell blocks CLB.

In order to achieve the above described arrangement, it is preferred that, in cell block CLBj, cell converter CL1 at a highest-potential end connected to first external connection terminal TPj be provided closer to a corresponding bypass circuit BCj than the remaining cell converters are. Further, it is preferred that cell converter CLn at a lowest-potential end connected to second external connection terminal TNj be provided remoter from a corresponding bypass circuit BCj than the remaining cell converters are. Similarly, it is preferred that, in cell block CLB(j+1), cell converter CL1 at the highest-potential end connected to first external connection terminal TP(j+1) be provided closer to bypass circuit BCj than the remaining cell converters are. Further, it is preferred that cell converter CLn at the lowest-potential end connected to second external connection terminal TN(j+1) be provided remoter from bypass circuit BCj than the remaining cell converters are.

[Example of Specific Structure of Arm Circuit]

Figure 11:
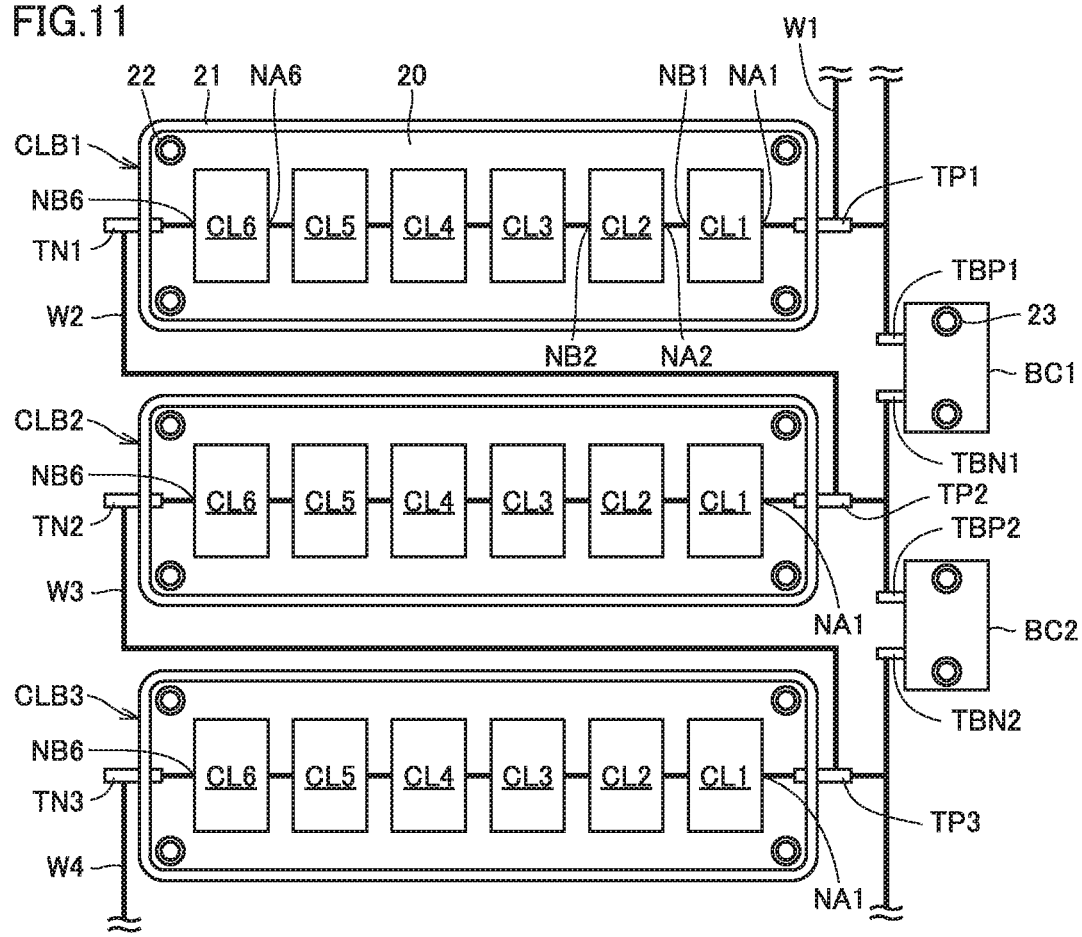
FIG. 11 is a plan view showing an example of a specific structure of the arm circuit of FIG. 9.

FIG. 11 is a plan view showing an example of a specific structure of the arm circuit of FIG. 9. The plan view of FIG. 11 corresponds to that of FIG. 4 in the first embodiment, and thus the components identical to those of FIG. 4 are identically denoted and the description of such components will not be repeated.

FIG. 11 shows an example in which six cell converters CL1 to CL6 are provided for each cell block CLB (a case of n=6). The arrangement of first and second cell blocks CLB1, CLB2 and bypass circuit BC1 are described hereinafter, and ditto for the other cell blocks CLB and bypass circuits BC.

As shown in FIG. 11, in cell block CLB1, first external connection terminal TP1 is provided near a first short side of rectangular substrate 20, and second external connection terminal TN1 is provided near a second short side opposite to the first short side. Similarly, in cell block CLB2, first external connection terminal TP2 is provided near a first short side of rectangular substrate 20, and second external connection terminal TN2 is provided near a second short side opposite to the first short side. First external connection terminals TP1, TP2 are provided on the side close to a corresponding bypass circuit BC1, and second external connection terminals TN1, TN2 are provided on the side remote from a corresponding bypass circuit BC1.

In cell block CLB1 (CLB2), cell converter CL1 at the highest-potential end is arranged close to first external connection terminal TP1 (TP2); and cell converters CL1, CL2, CL6 are arranged in this order toward the side remote from first external connection terminal TP1 (TP2). Cell converter CL6 at the lowest-potential end is arranged close to second external connection terminal TN1 (TN2). Thus, as shown in FIG. 11, external connection terminal TP1 (TP2), cell converters CL1, CL2, CL6, and external connection terminal TN1 (TN2) are linearly arranged in this order. As a result, interconnect W2 which connects low-potential-side external connection terminal TN1 of cell block CLB1 and high-potential-side external connection terminal TP2 of cell block CLB2 is longer than that of the first embodiment. In the second embodiment, this interconnect W2 is not used as the current path via bypass circuits BC, but is used only as the current path via cell blocks CLB. Thus, the impedance of the current path via cell blocks CLB can be larger.

Bypass circuit BC1 is arranged at a position facing high-potential-side external connection terminal TP1 of cell block CLB1 and facing high-potential-side external connection terminal TP2 of cell block CLB2. This allows connection between external connection terminal TP1 of cell block CLB1 and external connection terminal TBP1 of bypass circuit BC1 with a shortest possible interconnect, and allows connection between external connection terminal TP2 of cell block CLB2 and external connection terminal TBN1 of bypass circuit BC1 with a shortest possible interconnect.

[Advantageous Effects]

In the second embodiment described above, similarly to the first embodiment, at the time of a short-circuit accident at the DC circuit, the circulating-current path via bypass circuits BC can be smaller in impedance than the circulating-current path via cell blocks CLB. Also, a plurality of cell converters CL can be arranged to be compact in size.

Third Embodiment

[Configuration of Arm Circuit]

Figure 12:
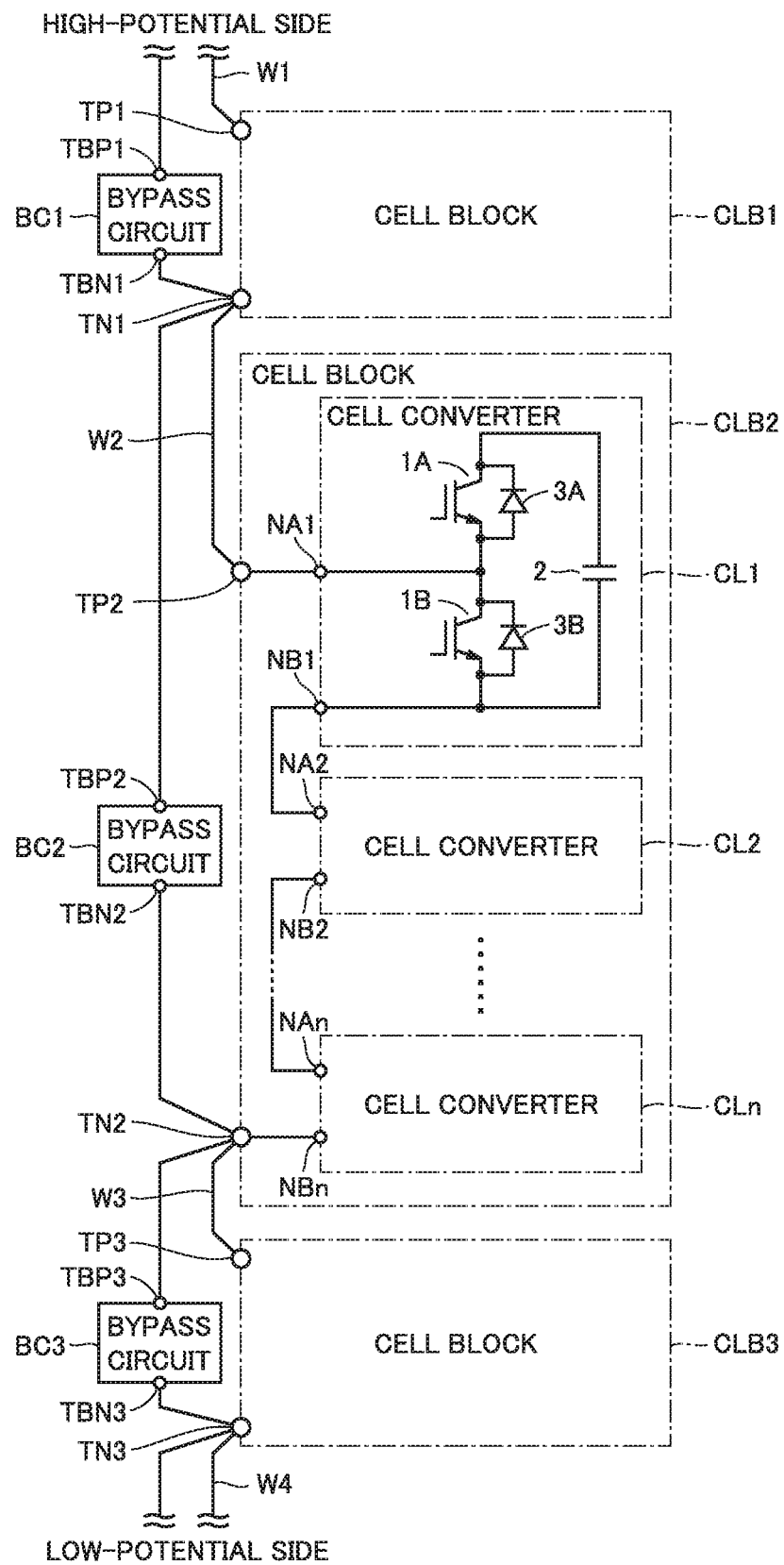
FIG. 12 is a circuit diagram showing a configuration of each arm circuit of FIG. 1 in a third embodiment.

FIG. 12 is a circuit diagram showing a configuration of each arm circuit of FIG. 1 in a third embodiment. The configuration of the arm circuit in FIG. 12 is different from that of the first embodiment in FIG. 2 in the connection of each bypass circuit BC.

Specifically, in the case of FIG. 12, bypass circuit BCk (k is any integer satisfying 2≤k≤m) is connected directly (i.e., without another external connection terminal lying therebetween) to second external connection terminal TN(k−1) of cell block CLB(k−1) and to second external connection terminal TNk of a corresponding cell block CLBk. That is, high-potential-side external connection terminal TBPk of bypass circuit BCk is connected to low-potential-side external connection terminal TN(k−1) of cell block CLB(k−1) via an interconnect, and low-potential-side external connection terminal TBNk of bypass circuit BCk is connected to low-potential-side external connection terminal TNk of cell block CLBk via an interconnect.

Note that high-potential-side external connection terminal TBP1 of bypass circuit BC1 at a highest-potential end and high-potential-side external connection terminal TP1 of cell block CLB1 at a highest-potential end are connected to each other (or connected to the same node). FIG. 12 is the same as FIG. 2 in the other respects, and thus identical or corresponding components are identically denoted and the description of such components will not be repeated.

[Path of Circulating Current at the Time of DC Short Circuit]

Figure 13:
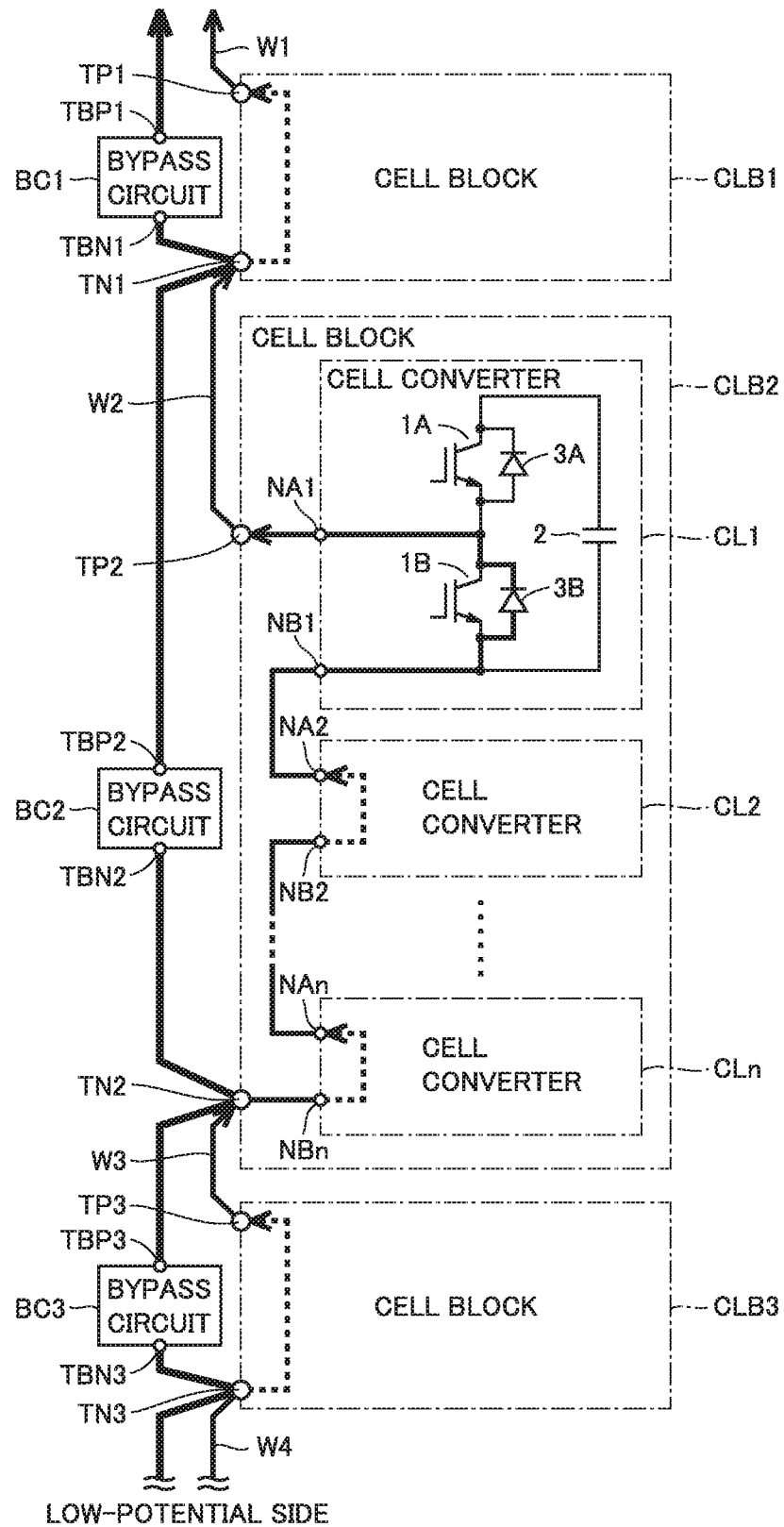
FIG. 13 shows a path of circulating current at the time of a short-circuit accident at the DC circuit, in the arm circuit of FIG. 12.

FIG. 13 shows a path of circulating current at the time of a short-circuit accident at the DC circuit, in the arm circuit of FIG. 12.

As shown in FIG. 13, a path of circulating current includes a path of current flowing through each bypass circuit BC indicated by a thick line in FIG. 13, and a path of current flowing through freewheel diode 3B of each cell block CLB indicated by a moderate-thickness line in FIG. 13. In the case of the third embodiment, the former short-circuit current via bypass circuits BC does not flow through the interconnects (interconnects W1, W2, W3, W4 in FIG. 13) between adjacent cell blocks CLB.

In order to protect freewheel diode 3B of each cell converter CL, the amount of current in the former current path via bypass circuits BC should be larger than the amount of current in the latter current path via cell blocks CLB. For this purpose, the distance between second external connection terminal TN(k−1) of cell block CLB(k−1) (k is any integer satisfying 2≤k≤m) and second external connection terminal TNk of cell block CLBk should be as short as possible, and the connection lines between these second external connection terminals TN(k−1), TNk and bypass circuit BCk should be as short at possible. By doing so, if a DC short-circuit accident occurs in the HVDC system, the circulating-current path via each bypass circuit BC can be smaller in impedance than the circulating-current path via cell converters CL1 to CLn in each cell block CLB. This allows more DC short-circuit circulating current to flow in bypass circuits BC than in cell blocks CLB.

In order to achieve the above described arrangement, it is preferred that, in cell block CLB(k−1), cell converter CLn at the lowest-potential end connected to second external connection terminal TN(k−1) be provided closer to a corresponding bypass circuit BCk than the remaining cell converters are. Further, it is preferred that cell converter CL1 at the highest-potential end connected to first external connection terminal TP(k−1) be provided remoter from bypass circuit BCk than the remaining cell converters are. Similarly, it is preferred that, in cell block CLBk, cell converter CLn at the lowest-potential end connected to second external connection terminal TNk be provided closer to bypass circuit BCk than the remaining cell converters are. Further, it is preferred that cell converter CL1 at the highest-potential end connected to first external connection terminal TPk be provided remoter from bypass circuit BCk than the remaining cell converters are.

[Example of Specific Structure of Arm Circuit]

Figure 14:
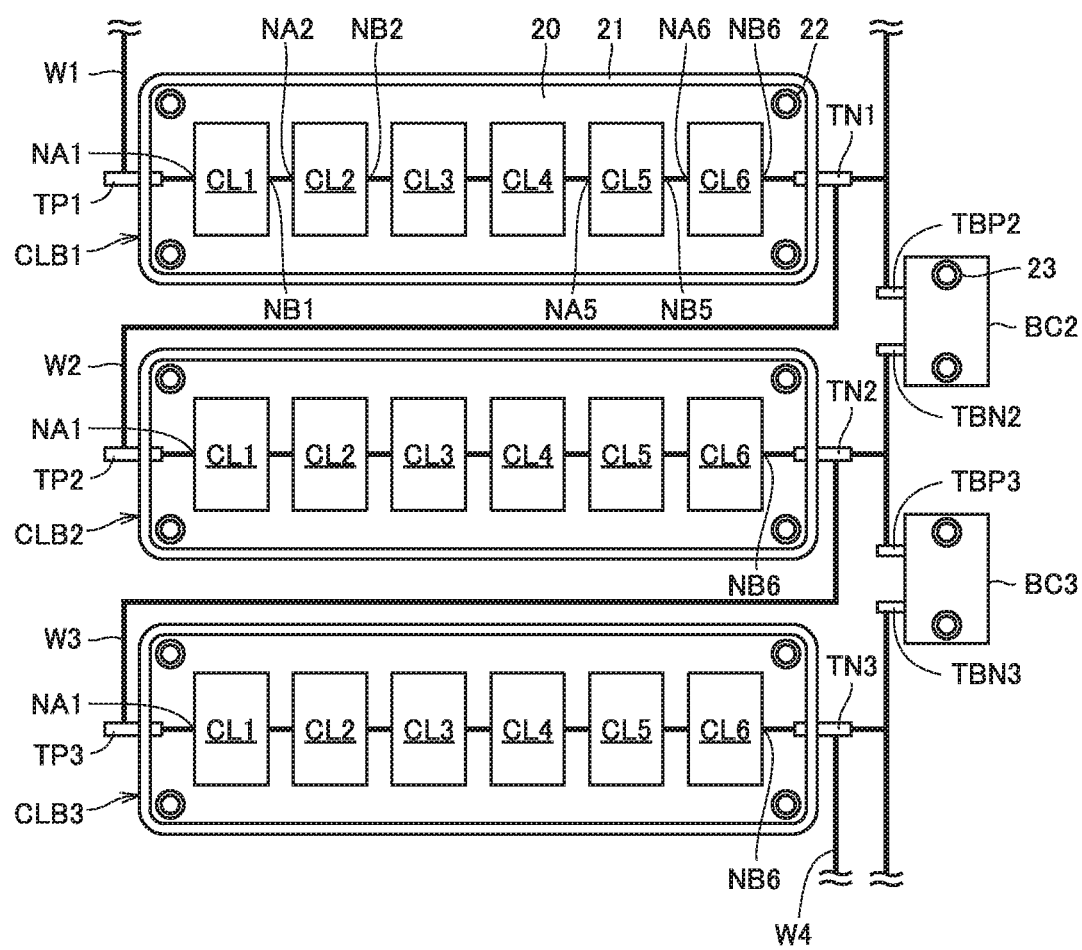
FIG. 14 is a plan view showing an example of a specific structure of the arm circuit of FIG. 12.

FIG. 14 is a plan view showing an example of a specific structure of the arm circuit of FIG. 12. The plan view of FIG. 14 corresponds to that of FIG. 4 in the first embodiment, and thus the components identical to those of FIG. 4 are identically denoted and the description of such components will not be repeated.

FIG. 14 shows an example in which six cell converters CL1 to CL6 are provided for each cell block CLB (a case of n=6). The arrangement of first and second cell blocks CLB1, CLB2 and bypass circuit BC2 are described hereinafter, and ditto for the other cell blocks CLB and bypass circuits BC.

As shown in FIG. 14, in cell block CLB1, second external connection terminal TN1 is provided near a first short side of rectangular substrate 20, and first external connection terminal TP1 is provided near a second short side opposite to the first short side. Similarly, in cell block CLB2, second external connection terminal TN2 is provided near a first short side of rectangular substrate 20, and first external connection terminal TP2 is provided near a second short side opposite to the first short side. First external connection terminals TP1, TP2 are provided on the side remote from a corresponding bypass circuit BC2, and second external connection terminals TN1, TN2 are provided on the side close to a corresponding bypass circuit BC2.

In cell block CLB1 (CLB2), cell converter CL1 at the highest-potential end is arranged close to first external connection terminal TP1 (TP2); and cell converters CL1, CL2, . . . , CL6 are arranged in this order toward the side remote from first external connection terminal TP1 (TP2). Cell converter CL6 at the lowest-potential end is arranged close to second external connection terminal TN1 (TN2). Thus, as shown in FIG. 14, external connection terminal TP1 (TP2), cell converters CL1, CL2, CL6, and external connection terminal TN1 (TN2) are linearly arranged in this order. As a result, interconnect W2 which connects lowpotential-side external connection terminal TN1 of cell block CLB1 and high-potential-side external connection terminal TP2 of cell block CLB2 is longer than that of the first embodiment. In the third embodiment, this interconnect W2 is not used as the path of short-circuit current via bypass circuits BC, but is used only as the path of short-circuit current via cell blocks CLB. Thus, the impedance of the path of short-circuit current via cell blocks CLB can be larger.

Bypass circuit BC2 is arranged at a position facing low-potential-side external connection terminal TN1 of cell block CLB1 and facing low-potential-side external connection terminal TN2 of cell block CLB2. This allows connection between external connection terminal TN1 of cell block CLB1 and external connection terminal TBP2 of bypass circuit BC2 with a shortest possible interconnect, and allows connection between external connection terminal TN2 of cell block CLB2 and external connection terminal TBN2 of bypass circuit BC2 with a shortest possible interconnect.

[Advantageous Effects]

According to the above-described third embodiment, at the time of a short-circuit accident at the DC circuit, the circulating-current path via bypass circuits BC can be smaller in impedance than the circulating-current path via cell blocks CLB. Also, a plurality of cell converters CL can be arranged to be compact in size.

Fourth Embodiment

In the fourth embodiment, an example is described in which each bypass circuit BC is provided in parallel not with one cell block CLB but with a plurality of cell blocks CLB connected in cascade. A plurality of cell blocks CLB corresponding to bypass circuit BC are hereinafter referred to as a cell block aggregate CBA.

[Configuration of Arm Circuit]

Figure 15:
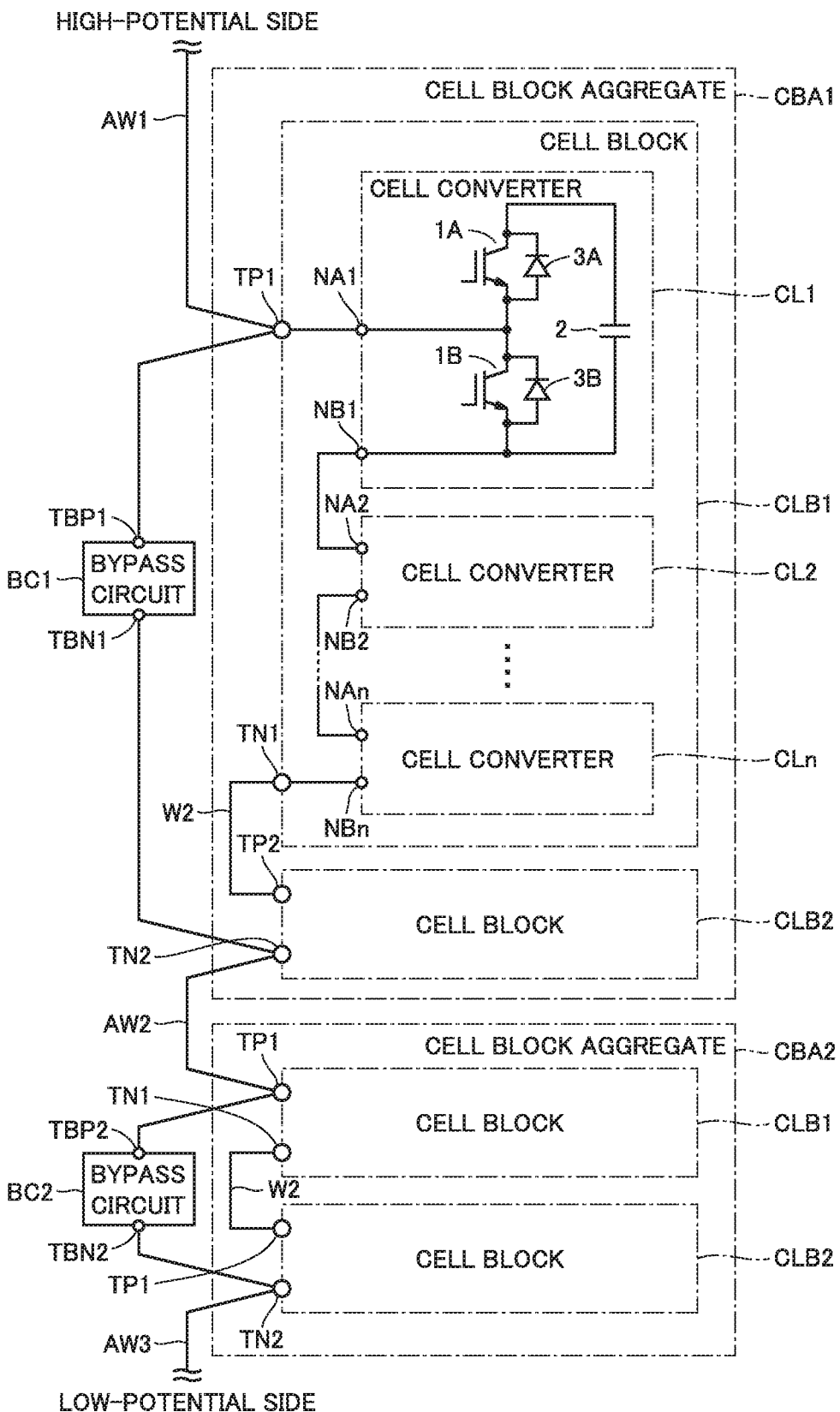
FIG. 15 is a circuit diagram showing a configuration of each arm circuit of FIG. 1 in a fourth embodiment.

FIG. 15 is a circuit diagram showing a configuration of each arm circuit of FIG. 1 in a fourth embodiment. With reference to FIG. 15, each arm circuit includes m cell block aggregates CBA (m is an integer of 2 or more) connected in cascade, from first cell block aggregate CBA1 at a high-potential end to mth cell block aggregate CBAm at a low-potential end. In the case of FIG. 15, cell block aggregate CBA1 and cell block aggregate CBA2 are representatively shown. Each arm circuit further includes m bypass circuits BC corresponding to m cell block aggregates CBA, respectively. The m bypass circuits BC include first bypass circuit BC1 at a high-potential end to mth bypass circuit BCm at a low-potential end. Each bypass circuit BC is electrically connected in parallel with a corresponding cell block aggregate CBA.

Each cell block aggregate CBA includes a plurality of cell blocks CLB connected in cascade. In the case of FIG. 15, two cell blocks CLB are shown for each cell block aggregate CBA. However, each cell block aggregate CBA may be constituted of any number of cell blocks CLB. The number of cell blocks may vary from one cell block aggregate to another. The configuration of each cell block CLB is as described with reference to FIG. 2, and thus the explanation is not repeated.

Bypass circuit BCi (i is any integer satisfying 1≤i≤m) is provided electrically in parallel with a corresponding cell block aggregate CBAi. Specifically, high-potential-side external connection terminal TBPi of bypass circuit BCi is connected to first external connection terminal TP1 of cell block CLB1 at a highest-potential end among a plurality of cell blocks constituting the corresponding ith cell block aggregate CBAi via an interconnect. Low-potential-side external connection terminal TBNi of bypass circuit BCi is connected to second external connection terminal TNp of cell block CLBp at a lowest-potential end (p=2 in the case of FIG. 15) among a plurality of cell blocks constituting the corresponding ith cell block aggregate CBAi.

In order to prevent breakage of freewheel diode 3B of each cell converter CL by a circulating current flowing at the time of a short-circuit accident at the DC circuit, the path of circulating current via bypass circuits BC should be smaller in impedance than the path of circulating current via cell block aggregates CBA. For this purpose, in each cell block aggregate CBA, the distance between first external connection terminal TP1 of cell block CLB1 at the highest-potential end and second external connection terminal TNp of cell block CLBp at the lowest-potential end (p=2 in the case of FIG. 15) should be as short as possible, and the connection lines between these external connection terminals and a corresponding bypass circuit BC should be as short at possible.

In order to achieve the above described arrangement, it is preferred that, in cell block CLB1 at the highest-potential end of each cell block aggregate CBAi (i is any integer satisfying 1≤i≤m), cell converter CL1 connected to first external connection terminal TP1 be provided closer to a corresponding bypass circuit BCi than the remaining cell converters are. Further, it is preferred that cell converter CLn connected to second external connection terminal TN1 be provided remoter from a corresponding bypass circuit BCi than the remaining cell converters are.

Similarly, it is preferred that, in cell block CLBp at the lowest-potential end of each cell block aggregate CBAi, cell converter CLn at the lowest-potential end connected to second external connection terminal TNp be provided closer to a corresponding bypass circuit BCi than the remaining cell converters are. Further, it is preferred that cell converter CL1 at the highest-potential end connected to first external connection terminal TPp be provided remoter from a corresponding bypass circuit BCi than the remaining cell converters are.

[Example of Specific Structure of Arm Circuit]

Figure 16:
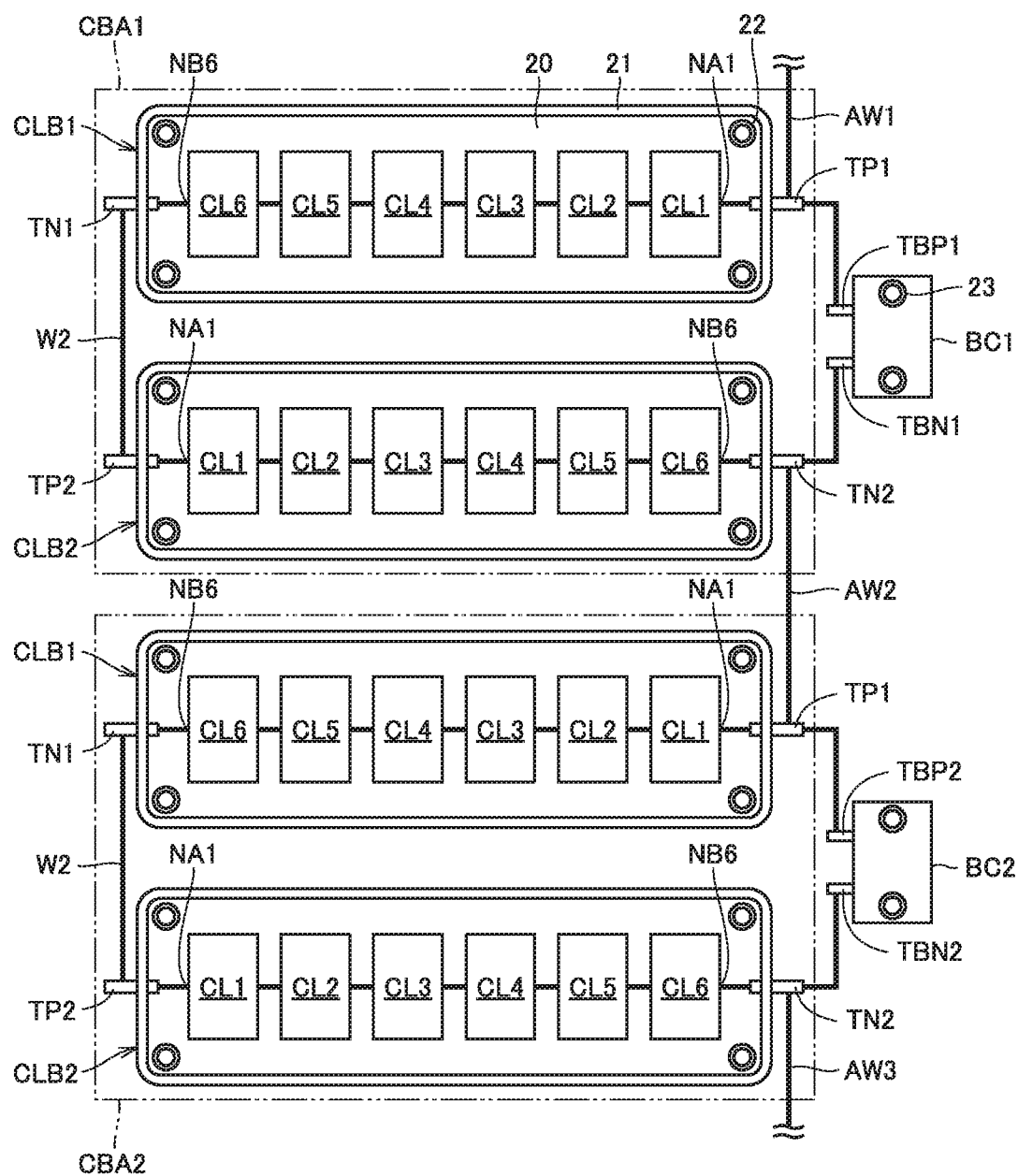
FIG. 16 is a plan view showing an example of a specific structure of the arm circuit of FIG. 15.

FIG. 16 is a plan view showing an example of a specific structure of the arm circuit of FIG. 15. FIG. 16 shows an example in which six cell converters CL1 to CL6 are provided for each cell block CLB (a case of n=6). The arrangement of first and second cell blocks CLB1, CLB2 constituting first cell block aggregate CBA1 and bypass circuit BC1 are described hereinafter, and ditto for the other cell blocks CLB and bypass circuits BC.

As shown in FIG. 16, in cell block CLB1, first external connection terminal TP1 is provided near a first short side of rectangular substrate 20, and second external connection terminal TN1 is provided near a second short side opposite to the first short side. Reversely, in cell block CLB2, second external connection terminal TN2 is provided near a first short side of rectangular substrate 20, and first external connection terminal TP2 is provided near a second short side opposite to the first short side. First external connection terminal TP1 of cell block CLB1 and second external connection terminal TN2 of cell block CLB2 are provided on the side close to a corresponding bypass circuit BC1, whereas second external connection terminal TN1 of cell block CLB1 and first external connection terminal TP2 of cell block CLB2 are provided on the side remote from a corresponding bypass circuit BC1.

In cell block CLB1 (CLB2), cell converter CL1 at the highest-potential end is arranged close to first external connection terminal TP1 (TP2); and cell converters CL1, CL2, . . . , CL6 are arranged in this order toward the side remote from first external connection terminal TP1 (TP2). Cell converter CL6 at the lowest-potential end is arranged close to second external connection terminal TN1 (TN2). Thus, as shown in FIG. 16, external connection terminal TP1 (TP2), cell converters CL1, CL2, . . . , CL6, and external connection terminal TN1 (TN2) are linearly arranged in this order.

Bypass circuit BC1 is arranged at a position facing high-potential-side external connection terminal TP1 of cell block CLB1 and facing low-potential-side external connection terminal TN2 of cell block CLB2. This allows connection between first external connection terminal TP1 of cell block CLB1 and external connection terminal TBP1 of bypass circuit BC1 with a shortest possible interconnect, and allows connection between second external connection terminal TN2 of cell block CLB2 and external connection terminal TBN1 of bypass circuit BC1 with a shortest possible interconnect.

[Advantageous Effects]

According to the above-described fourth embodiment, at the time of a short-circuit accident at the DC circuit, the circulating-current path via bypass circuits BC can be smaller in impedance than the circulating-current path via cell blocks CLB. Also, a plurality of cell converters CL can be arranged to be compact in size.

<Variation>

The above first to fourth embodiments each describe a case where each cell converter CL is a half-bridge type. However, all of a plurality of cell converters CL constituting each cell block CLB may be of a full-bridge type; or some of them may be of a full-bridge type, with the remaining cell converters CL being of a half-bridge type. Further, some of or all of a plurality of cell converters CL constituting each cell block CLB may be hybrid-type cell converters described below. Supplementary description of a full-bridge cell converter and a hybrid-type cell converter is given hereinafter.

[Full-Bridge Cell Configuration and Hybrid-Type Cell Configuration]

Figure 17A:
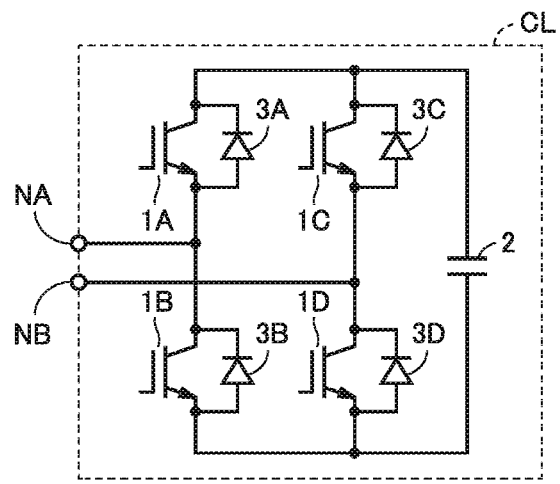
FIGS. 17A and 17B are circuit diagrams each showing configurations of a full-bridge cell converter and a hybrid-type cell converter.
Figure 17B:
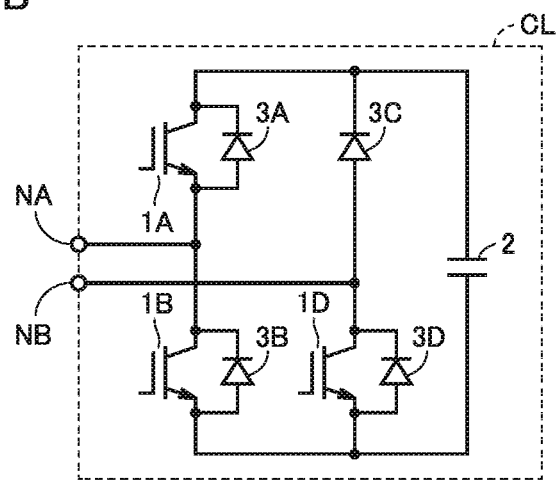

FIGS. 17A and 17B are circuit diagrams each showing configurations of a full-bridge cell converter and a hybrid-type cell converter. FIG. 17A shows a full-bridge configuration, and FIG. 17B shows a hybrid-type configuration.

With reference to FIG. 17A, full-bridge converter cell CL is different from half-bridge converter cell CL shown in FIG. 2 in that the former further includes switching elements 1C, 1D connected in series and diodes 3C, 3D connected in anti-parallel with switching elements 1C, 1D, respectively. Switching elements 1C, 1D as a whole are connected in parallel with the series connection circuit of switching elements 1A, 1B, and are connected in parallel with DC capacitor 2. An output node NA is connected to the connection node between switching elements 1A and 1B, and an output node NB is connected to the connection node between switching elements 1C and 1D.

At the time of normal operation (i.e., when a zero voltage or a positive voltage is output between output nodes NA and NB), full-bridge converter cell CL is controlled so that switching element 1D is always ON, switching element 1C is always OFF, and so that switching elements 1A and 1B are alternately turned on.

Full-bridge converter cell CL may also output a zero voltage or a negative voltage by controlling switching element 1A to be always OFF, controlling switching element 1B to be always ON, and controlling switching elements 1C and 1D to be alternately turned on.

With reference to FIG. 17B, hybrid-type converter cell CL has a configuration obtained by eliminating any one of switching elements 1A, 1B, 1C, and 1D from full-bridge converter cell CL shown in FIG. 17A. FIG. 17B shows a configuration where switching element 1C is eliminated. At the time of normal operation (i.e., when a zero voltage or a positive voltage is output between output nodes NA and NB), hybrid-type converter cell CL shown in FIG. 17B is controlled so that switching element 1D is always ON and so that switching elements 1A and 1B are alternately turned on.

As a variation of the above, a configuration obtained by eliminating switching element 1A from FIG. 17A can output a zero voltage or a negative voltage by controlling switching element 1B to be always ON, and controlling switching elements 1C and 1D to be alternately turned on. A configuration obtained by eliminating switching element 1B from FIG. 17A can output a zero voltage or a positive voltage by controlling switching element 1A to be always ON, and controlling switching elements 1C and 1D to be alternately turned on. A configuration obtained by eliminating switching element 1D from FIG. 17A can output a zero voltage or a negative voltage by controlling switching element 1C to be always ON, and controlling switching elements 1A and 1B to be alternately turned on.

[Path of Circulating Current at the Time of DC Short Circuit]

As described with reference to, for example, FIG. 3, when a short-circuit accident at the DC circuit is detected, all the semiconductor switching elements constituting each cell converter are controlled to be OFF. At this time, with full-bridge or hybrid-type cell converters, a short-circuit current of the DC circuit flows into the capacitors as energy storage devices. If about half or more of the converter cells of each cell block are of the full-bridge type (or of the hybrid type), a flow of short-circuit current into the capacitors of these converter cells will not be a problem because the capacitor voltages of these converter cells are synthesized and can block the short-circuit current from flowing in. If the number full-bridge (or hybrid-type) converter cells included in each arm circuit is small, however, the short-circuit current of the DC circuit continues to flow into the capacitors of the full-bridge (or hybrid-type) converter cells. This may cause breakage of the capacitors if the capacitor voltage exceeds a withstand voltage.

In the cases of the above-described embodiments, however, the length of current path via the bypass circuits can be much shorter than the length of current path via the cell blocks. Accordingly, at the time of a short-circuit accident at the DC circuit, the circulating-current path via bypass circuits BC can be much smaller in impedance than the circulating-current path via cell blocks CLB. As a result, the amount of current flowing into the capacitors of full-bridge (or hybrid-type) converter cells constituting each cell block can be reduced to the extent that the capacitor voltage does not exceed a withstand voltage. Therefore, the problem of breakage of capacitor can be avoided.

The embodiments disclosed herein should be construed as illustrative in every respect, not limitative. The scope of the present invention is defined not by the above description but by the terms of the claims, and is intended to include any modification within the meaning and scope equivalent to the terms of the claims.

REFERENCE SIGNS LIST 1A, 1B: switching element; 2: capacitor; 3A, 3B: freewheel diode; 11: leg circuit; 12: positive-side arm; 13:

negative-side arm; 14: reactor; 15: AC circuit; 16: DC circuit; 17: interconnected transformer; 20: insulating substrate; 21: insulating shield; 22, 23: insulator; 24, 25: pole; 29: mounting surface; 30: diode element; 31: thyristor element; 32: mechanical switch element; 33: IGBT element; 40A, 40X: element; 41: conductive plate; 42, 43: insulating member; 44: supporting member; BC: bypass circuit; CBA: cell block aggregate; CLB: cell block; CL: cell converter; NA, NB: output node; NN: negative-side DC terminal; NP: positive-side DC terminal; NU, NV, NW: AC terminal; TBN, TBP: external connection terminal (bypass circuit); TN, TP: external connection terminal (cell block)

The invention claimed is:

1. A power conversion apparatus comprising:
   m cell blocks (m is an integer of 2 or more) connected in cascade, the m cell blocks including a first cell block at a high-potential end to an mth cell block at a low-potential end; and
   m bypass circuits including a first bypass circuit at a high-potential end to an mth bypass circuit at a low-potential end, each of the m bypass circuits being electrically connected in parallel with a corresponding one of the m cell blocks,
   each of the cell blocks including:
      a first connection node on a high-potential side and a second connection node on a low-potential side for connection to another cell block; and
      a plurality of cell converters connected in cascade between the first connection node and the second connection node, each of the plurality of cell converters including an energy storage device,
   the plurality of cell converters including 3 or more cell converters,
   an ith bypass circuit (i is any integer satisfying 1≤i≤m) being connected to the first connection node and the second connection node of a corresponding ith cell block,
   in the ith cell block, a cell converter at a highest-potential end connected to the first connection node and a cell converter at a lowest-potential end connected to the second connection node being arranged closer to the corresponding ith bypass circuit than remaining cell converters are, wherein the first connection node and the second connection node are arranged in a first direction, the first connection node and the cell converter at the highest-potential end are arranged in a second direction crossing the first direction, and the second connection node and the cell converter at the lowest-potential end are arranged parallel to the second direction.

2. The power conversion apparatus according to claim 1, wherein
   in each of the cell blocks, the plurality of cell converters are mounted on a substrate, and
   the respective substrates of the plurality of cell blocks are arranged in a horizontal direction along a mounting surface of the power conversion apparatus.

3. The power conversion apparatus according to claim 1, wherein
   in each of the cell blocks, the plurality of cell converters are mounted on a substrate, and
   the respective substrates of the plurality of cell blocks are arranged so as to coincide in position as seen from a direction perpendicular to a mounting surface of the power conversion apparatus.

4. The power conversion apparatus according to claim 1, wherein each of the bypass circuits includes a diode element having a cathode connected on a high-potential side and an anode connected on a low-potential side.

5. The power conversion apparatus according to claim 1, wherein each of the bypass circuits includes a thyristor element having a cathode connected on a high-potential side and an anode connected on a low-potential side.

6. The power conversion apparatus according to claim 1, wherein each of the bypass circuits includes an insulated gate bipolar transistor element having an emitter connected on a high-potential side and a collector connected on a low-potential side.

7. The power conversion apparatus according to claim 1, wherein each of the bypass circuits includes a mechanical switch element.

8. The power conversion apparatus according to claim 4, wherein each of the bypass circuits has a stack structure where a plurality of elements are stacked.

9. A power conversion apparatus comprising:
   m cell blocks (m is an integer of 2 or more) connected in cascade, the m cell blocks including a first cell block at a high-potential end to an mth cell block at a low-potential end; and
   m bypass circuits including a first bypass circuit at a high-potential end to an mth bypass circuit at a low-potential end, each of the m bypass circuits being electrically connected in parallel with a corresponding one of the m cell blocks,
   each of the cell blocks including:
      a first connection node on a high-potential side and a second connection node on a low-potential side for connection to another cell block; and
      a plurality of cell converters connected in cascade between the first connection node and the second connection node, each of the plurality of cell converters including an energy storage device,
   a jth bypass circuit (j is any integer satisfying 1≤j≤m−1) being connected to the first connection node of a corresponding jth cell block and the first connection node of a (j+1)th cell block,
   in the jth cell block, a cell converter at a highest-potential end connected to the first connection node being arranged closer to the corresponding jth bypass circuit than remaining cell converters are,
   in the (j+1)th cell block, a cell converter at a highest-potential end connected to the first connection node being arranged closer to the jth bypass circuit than remaining cell converters are.

10. A power conversion apparatus comprising:
   m cell blocks (m is an integer of 2 or more) connected in cascade, the m cell blocks including a first cell block at a high-potential end to an mth cell block at a low-potential end; and
   m bypass circuits including a first bypass circuit at a high-potential end to an mth bypass circuit at a low-potential end, each of the m bypass circuits being electrically connected in parallel with a corresponding one of the m cell blocks,
   each of the cell blocks including:
      a first connection node on a high-potential side and a second connection node on a low-potential side for connection to another cell block; and
      a plurality of cell converters connected in cascade between the first connection node and the second connection node, each of the plurality of cell converters including an energy storage device,
   a kth bypass circuit (k is any integer satisfying 2≤k≤m) being connected to the second connection node of a (k−1)th cell block and the second connection node of a corresponding kth cell block, in the (k−1)th cell block, a cell converter at a lowest-potential end connected to the second connection node being arranged closer to the corresponding kth bypass circuit than remaining cell converters are, in the kth cell block, a cell converter at a lowest-potential end connected to the second connection node being arranged closer to the kth bypass circuit than remaining cell converters are.

* * * * *